(12) United States Patent
Seol et al.

(10) Patent No.: US 8,890,864 B2
(45) Date of Patent: Nov. 18, 2014

(54) MOBILE TERMINAL AND CONTROLLING METHOD THEREOF

(75) Inventors: Yunhwan Seol, Seoul (KR); Soojung Lim, Seoul (KR); Kyungdong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 13/615,358

(22) Filed: Sep. 13, 2012

(65) Prior Publication Data
US 2013/0150093 A1  Jun. 13, 2013

(30) Foreign Application Priority Data

Dec. 12, 2011 (KR) .................. 10-2011-0133059
Feb. 13, 2012 (KR) .................. 10-2012-0014178

(51) Int. Cl.
*G06T 15/00* (2011.01)
*H04W 24/00* (2009.01)

(52) U.S. Cl.
USPC .......................................... 345/419; 455/457

(58) Field of Classification Search
None
See application file for complete search history.

(56) References Cited

U.S. PATENT DOCUMENTS

2003/0152263 A1* 8/2003 Kawano et al. ............... 382/154

* cited by examiner

*Primary Examiner* — Kee M Tung
*Assistant Examiner* — Frank Chen
(74) *Attorney, Agent, or Firm* — Lee, Hong, Degerman, Kang & Waimey

(57) ABSTRACT

A mobile terminal and 3D image controlling method therein are disclosed to create a 3D image. The present invention includes displaying a map in a prescribed range on a display unit with reference to a current location, setting $1^{st}$ area to create a 3D space image on the display map, displaying a $1^{st}$ shot location information for obtaining a plurality of right and left eye images within the set $1^{st}$ area using at least one of a distance information and an angle information, consecutively obtaining a plurality of the right and left eye images within the set $1^{st}$ area, creating a source image of the 3D space image for the $1^{st}$ area by synthesizing a plurality of the obtained right and left eye images together, and outputting the created source image to be outputted as a 3D image of a stereoscopic type via the display unit.

20 Claims, 23 Drawing Sheets

FIG. 13
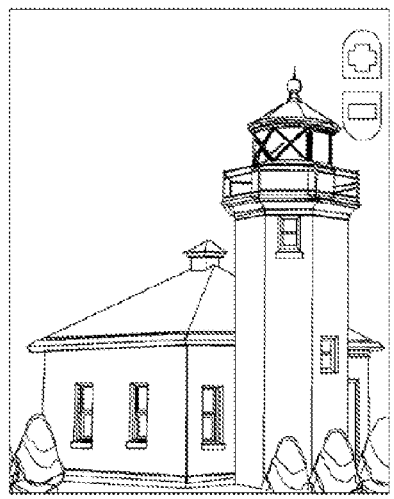
(a)
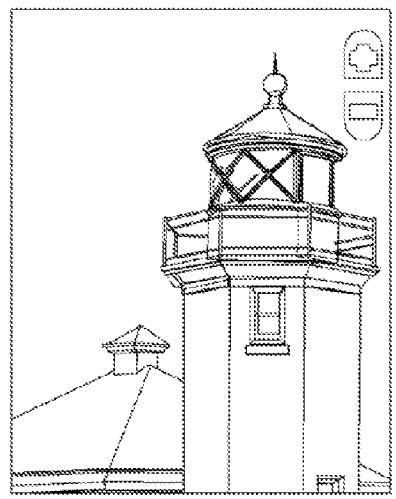
(b)
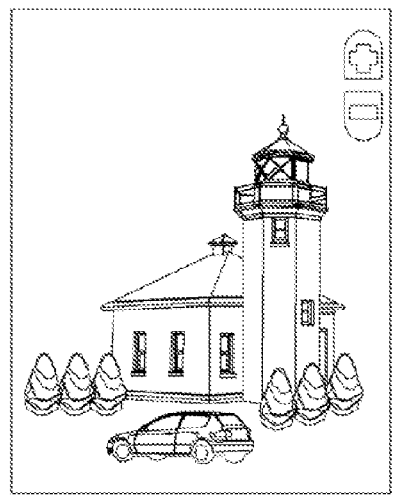
(c)

FIG. 16
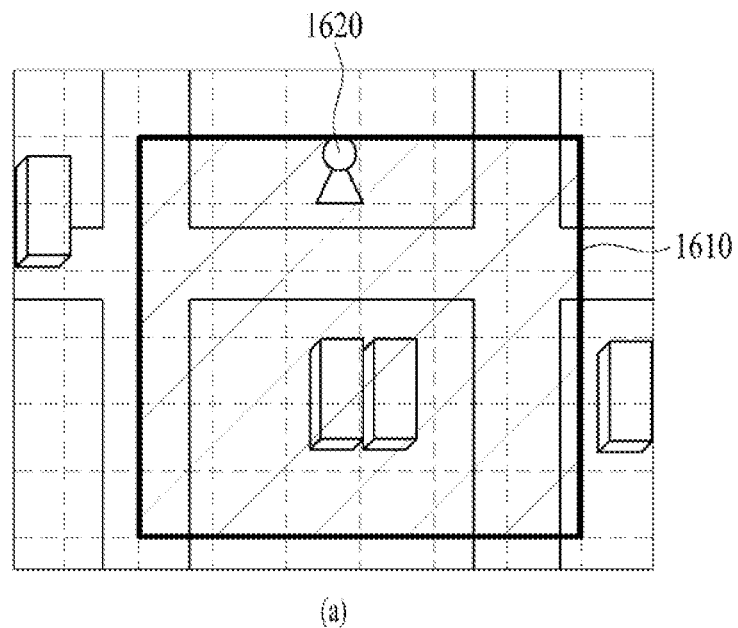
(a)
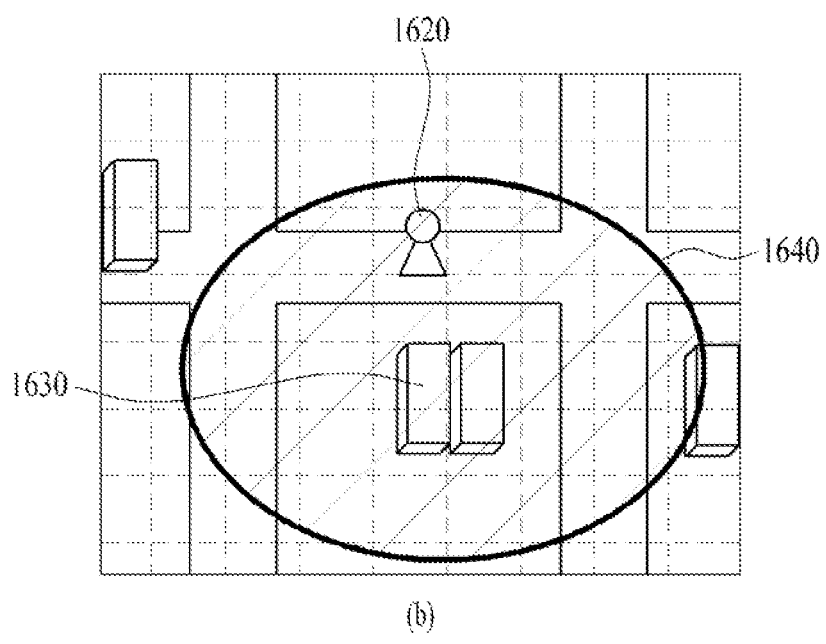
(b)

FIG. 17
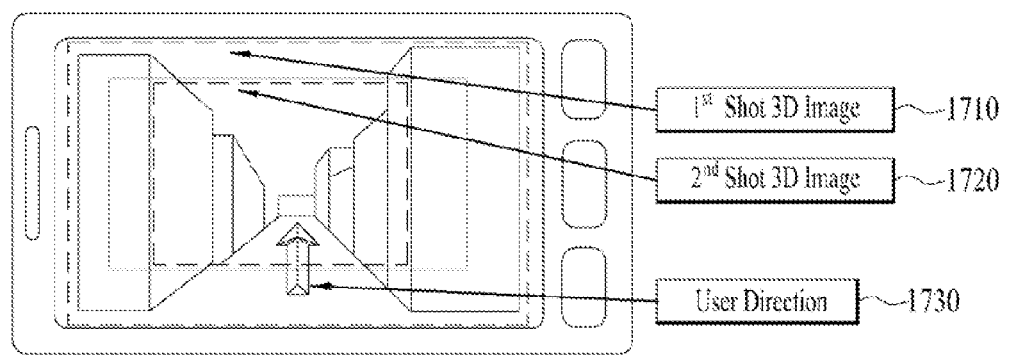
(a)
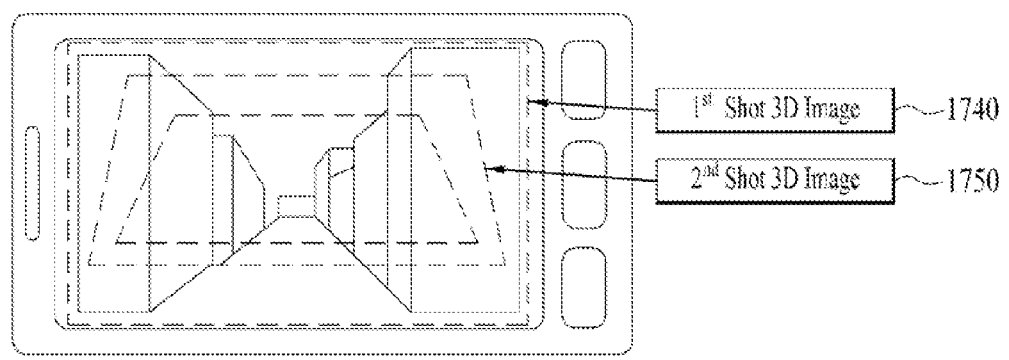
(b)

FIG. 18
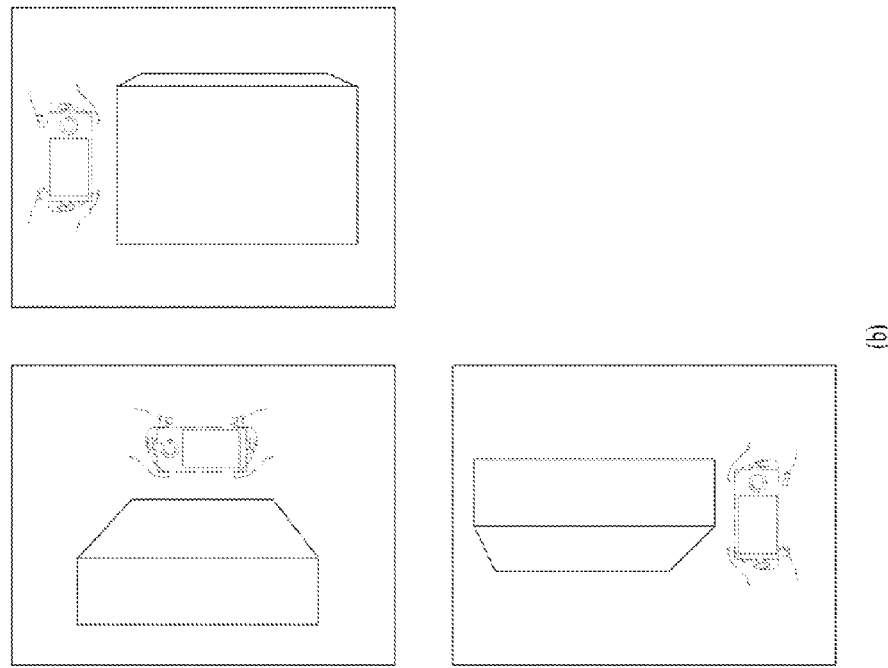
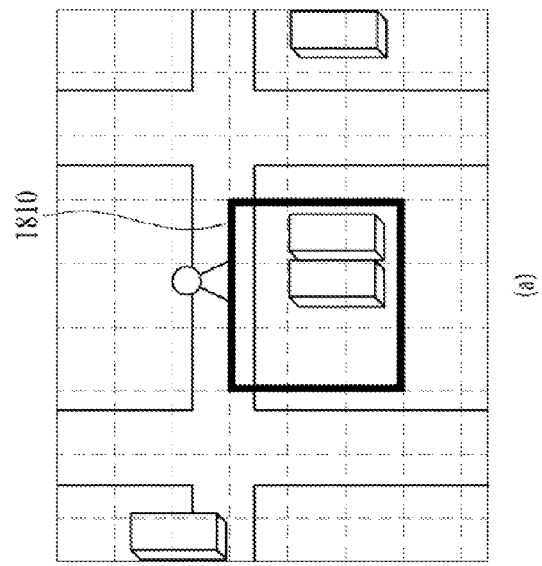

FIG. 21
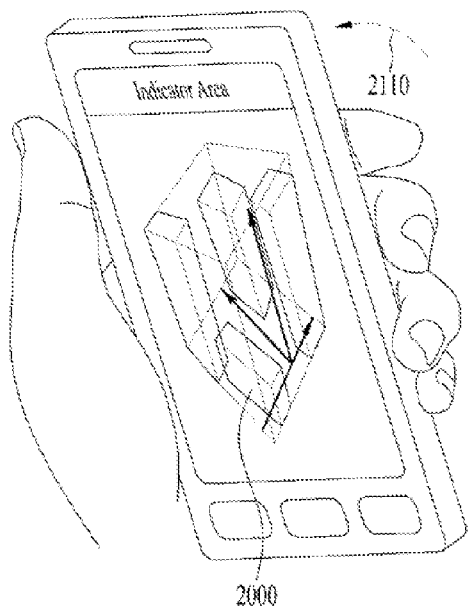
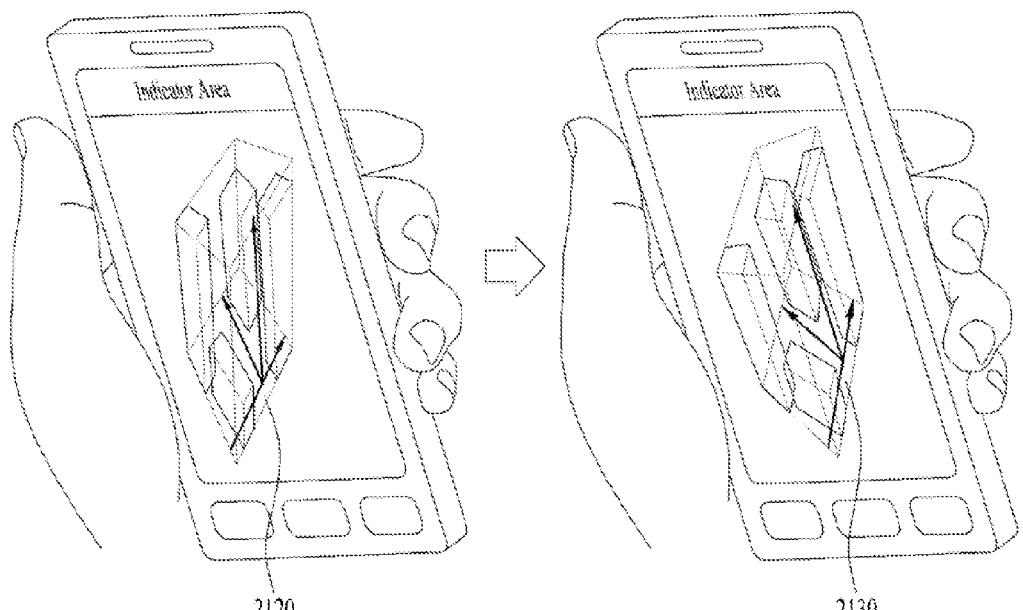

FIG. 23
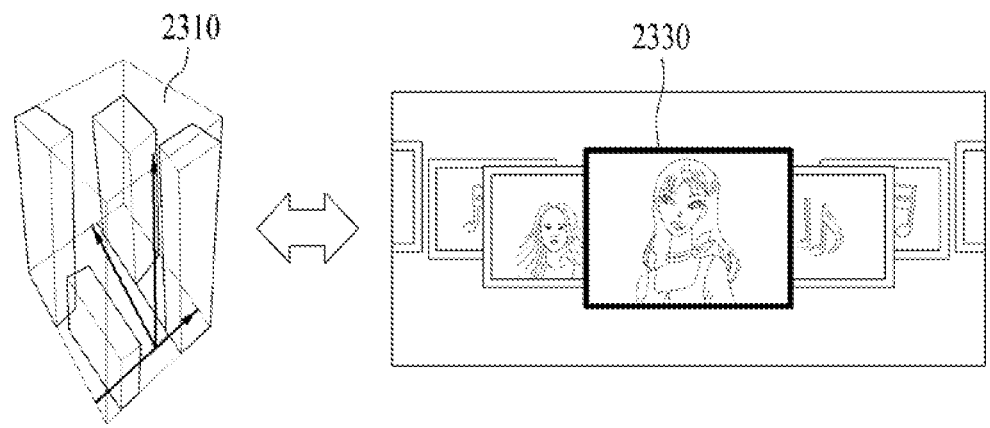
(a)
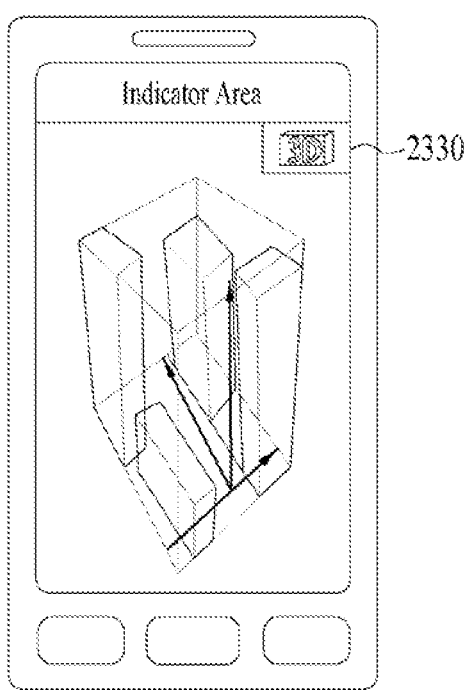
(b)

MOBILE TERMINAL AND CONTROLLING METHOD THEREOF

Pursuant to 35 U.S.C. §119(a), this application claims the benefit of earlier filing date and right of priority to Korean Application No. 10-2011-0133059, filed on Dec. 12, 2011, and Korean Application No. 10-2012-0014178, filed on Feb. 13, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for creating a stereoscopic image.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, a 3-dimensional (hereinafter abbreviated 3D) image of a stereoscopic type is implemented via a display unit of a mobile terminal. In order to implement this stereoscopic 3D image, it may be necessary to prepare an image for a left eye (hereinafter named a left eye image) and an image for a right eye (hereinafter named a right eye image), i.e., source contents for a stereoscopic 3D image output.

However, since a method of creating a stereoscopic 3D image is not feasible to be used by a general user, the demand for a method of supplementing this stereoscopic 3D image creating method is rising.

Moreover, since a user may further prefer to display a stereoscopic 3D image of a binocular disparity type generated from synthesizing a plurality of right and left eye images obtained in accordance with user's preference, the demands for more convenient methods of manipulation via a 3D user interface are rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal, by which a 3D image can be created easily and conveniently.

Another object of the present invention is to provide a mobile terminal, by which a 3D image can be easily created in the mobile terminal provided with a single camera only.

Another object of the present invention is to provide a mobile terminal, by which a zoom function of enlarging/reducing a stereoscopic image can be provided.

A further object of the present invention is to provide a mobile terminal and controlling method thereof, by which a user can be provided with a 3D space image of a stereoscopic type in a manner of synchronizing and synthesizing a plurality of consecutively acquired right and left eye images together.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a position location module, a display unit configured to display a map in a prescribed range with reference to a current location obtained via the position location module, a user input unit configured to set a $1^{st}$ area to create a 3D space image on the display map, a camera configured to consecutively obtain a plurality of right eye images and a plurality of left eye images within the set $1^{st}$ area, and a controller creating a source image of the 3D space image for the $1^{st}$ area by synthesizing a plurality of the obtained right eye images and a plurality of the obtained left eye images together, the controller controlling the created source image to be outputted as a 3D image of a stereoscopic type via the display unit, the controller controlling a $1^{st}$ shot location information for obtaining a plurality of the right eye images and a plurality of the left eye images within the set $1^{st}$ area to be displayed on a prescribed region of the display unit using at least one of a distance information and an angle information.

Preferably, if a $1^{st}$ object is selected from the set $1^{st}$ area via the user input unit, the controller may control the $1^{st}$ shot location information to be displayed with reference to the selected $1^{st}$ object.

Preferably, the controller may control the $1^{st}$ shot location information to be updated and displayed in response to a location change of the mobile terminal sensed via the position location module.

Preferably, the controller may control the display unit to further display a $2^{nd}$ shot location information indicating a direction for the mobile terminal to move in order to obtain a plurality of the right eye images and a plurality of the left eye images within the set $1^{st}$ area.

More preferably, the controller may give a prescribed visual effect to the $1^{st}$ shot location information and the $2^{nd}$ shot location information and the prescribed visual effect may include at least one of a color change, a definition change and a transparency change.

Preferably, the 3D space image may include a cubic space image.

Preferably, the display unit may include a touchscreen and in response to a touch inputted onto the touchscreen, the controller may control the 3D image of the stereoscopic type to be outputted in a manner of rotating.

Preferably, the display unit may include a touchscreen. And, if a touch of a $1^{st}$ pattern previously set is inputted via the touchscreen, the controller may control the 3D image of the stereoscopic type to be outputted by zoom-in or zoom-out.

Preferably, the mobile terminal may further include a sensing unit configured to sense an inclination of the mobile terminal. And, while the inclination of the mobile terminal is being sensed via the sensing unit, the controller may control the 3D image of the stereoscopic type to be outputted in a manner of rotating.

More preferably, the controller may control a direction and speed of the rotation to vary in response to the inclination.

Preferably, the display unit may include a touchscreen. And, if a touch of a $2^{nd}$ pattern previously set is inputted via the touchscreen, the controller may control a plurality of the right eye images and a plurality of the left eye images within the set $1^{st}$ area to be outputted as the 3D image of the stereoscopic type instead of the 3D space image.

In another aspect of the present invention, a method of controlling a mobile terminal includes the steps of displaying a map in a prescribed range on a display unit with reference to a current location obtained via a position location module, setting a $1^{st}$ area to create a 3D space image on the display map, displaying a $1^{st}$ shot location information for obtaining a plurality of right eye images and a plurality of left eye images within the set $1^{st}$ area using at least one of a distance information and an angle information, consecutively obtaining a plurality of the right eye images and a plurality of the left eye images within the set $1^{st}$ area, creating a source image of the 3D space image for the $1^{st}$ area by synthesizing a plurality of the obtained right eye images and a plurality of the obtained left eye images together, and outputting the created source image to be outputted as a 3D image of a stereoscopic type via the display unit.

Preferably, if a $1^{st}$ object is selected from the set $1^{st}$ area via the user input unit, the $1^{st}$ shot location information may be displayed with reference to the selected $1^{st}$ object.

Preferably, the $1^{st}$ shot location information may be updated and displayed in response to a location change of the mobile terminal.

Preferably, a $2^{nd}$ shot location information indicating a direction for the mobile terminal to move in order to obtain a plurality of the right eye images and a plurality of the left eye images within the set $1^{st}$ area may be further displayed.

Preferably, the 3D space image may include a cubic space image.

Preferably, the display unit may include a touchscreen and in response to a touch inputted onto the touchscreen, the 3D image of the stereoscopic type may be outputted in a manner of rotating.

Preferably, the display unit may include a touchscreen. And, if a touch of a $1^{st}$ pattern previously set is inputted via the touchscreen, the 3D image of the stereoscopic type may be outputted by zoom-in or zoom-out.

Preferably, while an inclination of the mobile terminal is being sensed via a sensing unit configured to sense the inclination of the mobile terminal, the 3D image of the stereoscopic type may be outputted in a manner of rotating and a direction and speed of the rotation may vary in response to the inclination.

Preferably, the display unit may include a touchscreen. And, if a touch of a $2^{nd}$ pattern previously set is inputted via the touchscreen, a plurality of the right eye images and a plurality of the left eye images within the set $1^{st}$ area may be outputted as the 3D image of the stereoscopic type instead of the 3D space image.

Accordingly, the embodiments of the present invention provide the following effects and/or features.

First of all, a mobile terminal according to at least one embodiment of the present invention creates a 3D image conveniently with ease.

Secondly, a mobile terminal according to at least one embodiment of the present invention displays a photographing place for creating a 3D image using location information of the mobile terminal, thereby facilitating the 3D image to be created in a mobile terminal provided with a single camera only.

Thirdly, a mobile terminal according to at least one embodiment of the present invention provides a zoom function of enlarging/reducing a 3D image using a plurality of 3D images, thereby enhancing user's convenience.

Fourthly, an image display apparatus according to at least one embodiment of the present invention enables a user to appreciate a 3D space image of a stereoscopic type created from a plurality of consecutively acquired right and left eye images.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram for one example of a zoom function applied to a 3D image according to one embodiment of the present invention;

FIG. 16 is a diagram for one example of setting a region for creating a stereoscopic 3D space image according to one embodiment of the present invention;

FIG. 17 is a diagram for one example of providing shot location information to a user using at least one of a distance and an angle according to one embodiment of the present invention;

FIG. 18 is a diagram for one example of providing shot location information to a user centering on a specific object according to one embodiment of the present invention;

FIG. 21 is a diagram for one example of displaying a created stereoscopic 3D space image by rotating the created stereoscopic 3D image 3-dimensionally in response of an inclination of a mobile terminal according to one embodiment of the present invention;

FIG. 23 is a diagram for one example of displaying a visual effect for indicating a stereoscopic 3D space image and a stereoscopic 3D space image or a normal 3D image according to one embodiment of the present invention, in which the stereoscopic 3D space image and the normal image are switched to each other.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
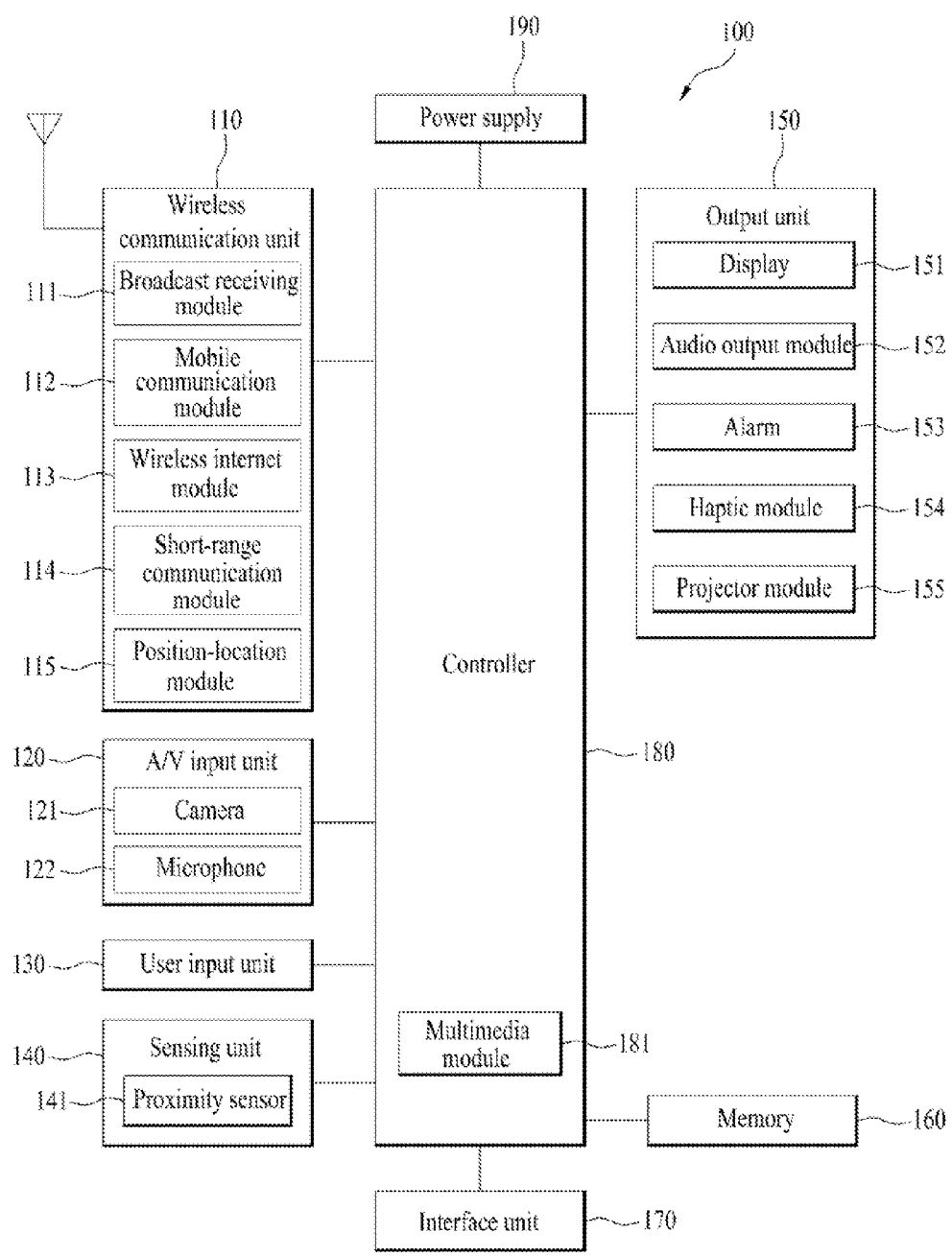
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

Therefore, the sensing unit 140 generates a sensing signal by detecting one of motions in various shapes through a location change and a direction change of the mobile terminal 100. And, at least one function can be executed to correspond to the sensing signal in accordance with each of the motions. Moreover, the relation between the motion and the function executed through the corresponding motion can be saved in the memory unit.

And, the sensing unit 140 is able to sense whether a power is supplied by the power supply unit 190, whether an external device is connected to the interface unit 170, and the like. Besides, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

Meanwhile, the sensing unit 140 is able to generate a sensing signal by detecting one of motions in various shapes through the location and direction changes of the mobile terminal 100. And, at least one function can be executed to correspond to the sensing signal in accordance with each of the motions. Moreover, the relation between the motion and the function executed through the corresponding motion can be saved in the memory unit 160.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
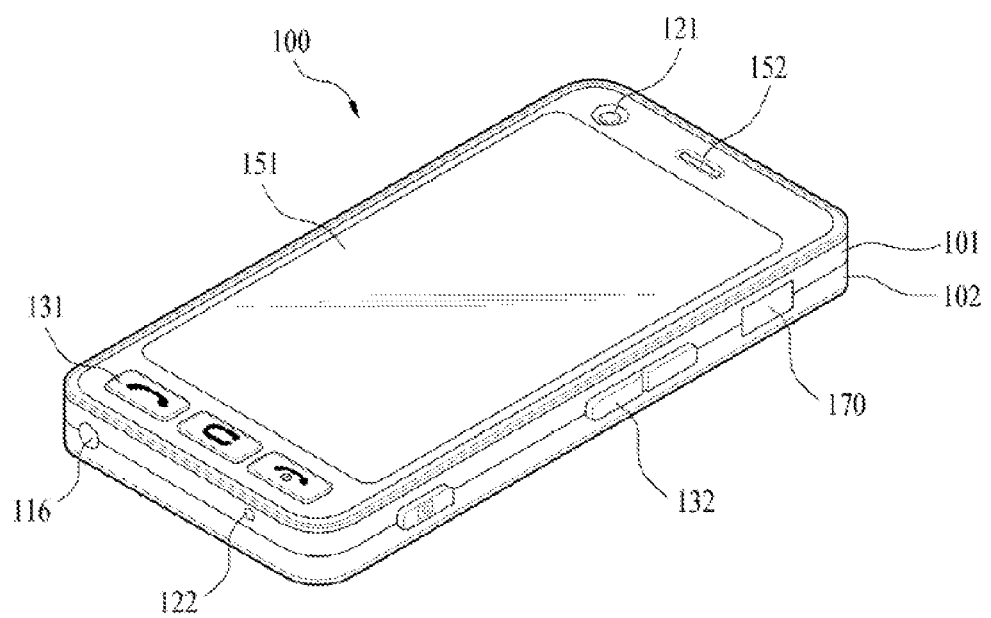
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Method of Implementing 3D Images

In the following description, a method of displaying a 3D image in a mobile terminal applicable to embodiments of the present invention and a display unit configuration for the same are explained.

First of all, 3D images implemented on the display unit 151 of the mobile terminal 100 may be mainly classified into two kinds of categories. In this case, the reference for this classification depends on whether different images are provided to both eyes, respectively.

The first 3D image category is described as follows,

First of all, the first category is a monoscopic technique of providing the same image to both eyes and is advantageous in that it can be implemented via a general display unit. In particular, the controller 180 arranges or renders at least one polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image.

Secondly, the second category is a stereoscopic technique of providing different image to both eyes, respectively, which uses the principle that a user can sense a 3D effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the 3D effect despite that there is an individual difference of the binocular disparity more or less. Therefore, the binocular disparity becomes the most important factor of the stereoscopic technique. The binocular disparity is explained in detail with reference to FIG. 3 as follows.

Figure 3:
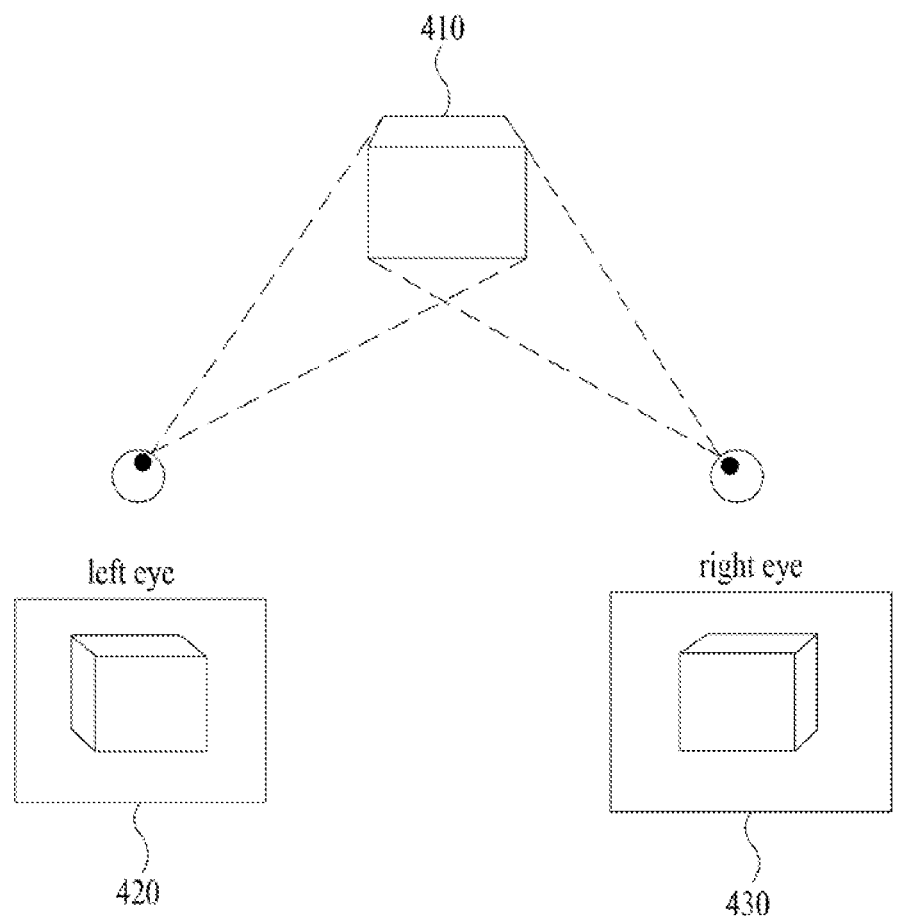
FIG. 3 is a diagram for describing the principle of binocular disparity.

FIG. 3 is a diagram for explaining the principle of binocular disparity.

Referring to FIG. 3, assume a situation that a hexahedron 310 is positioned as a subject in front below an eye's height to be seen through human eyes. In this case, a left eye is able to see a left eye planar image 320 revealing three facets including a top side, a front side and a left lateral side of the hexahedron 310 only. And, a right eye is able to see a right eye planar image 330 revealing three facets including the top side, the front side and a right lateral side of the hexahedron 310 only.

Even if a real thing is not actually positioned in front of both eyes of a user, when the left eye planar image 320 and the right eye planar image 330 are set to arrive at the left eye and the right eye, respectively, a user is able to substantially sense the hexahedron 310 as if looking at the hexahedron 310 in 3D actually.

Thus, in order to implement the 3D image belonging to the second category in the mobile terminal 100, images of the same object should arrive at both eyes in a manner of being discriminated from each other for the left and right eye images of the same object with a predetermined parallax.

For clarity of the following description, in order to distinguish the above-mentioned two categories from each other, a 3D image belonging to the $1^{st}$ category shall be named a stereo 2D image or a 3D rendered planar image and a 3D image belonging to the $2^{nd}$ category shall be named a stereoscopic 3D image.

In the following description, 3D depth attributed to the binocular disparity is explained with reference to FIG. 4.

Figure 4:
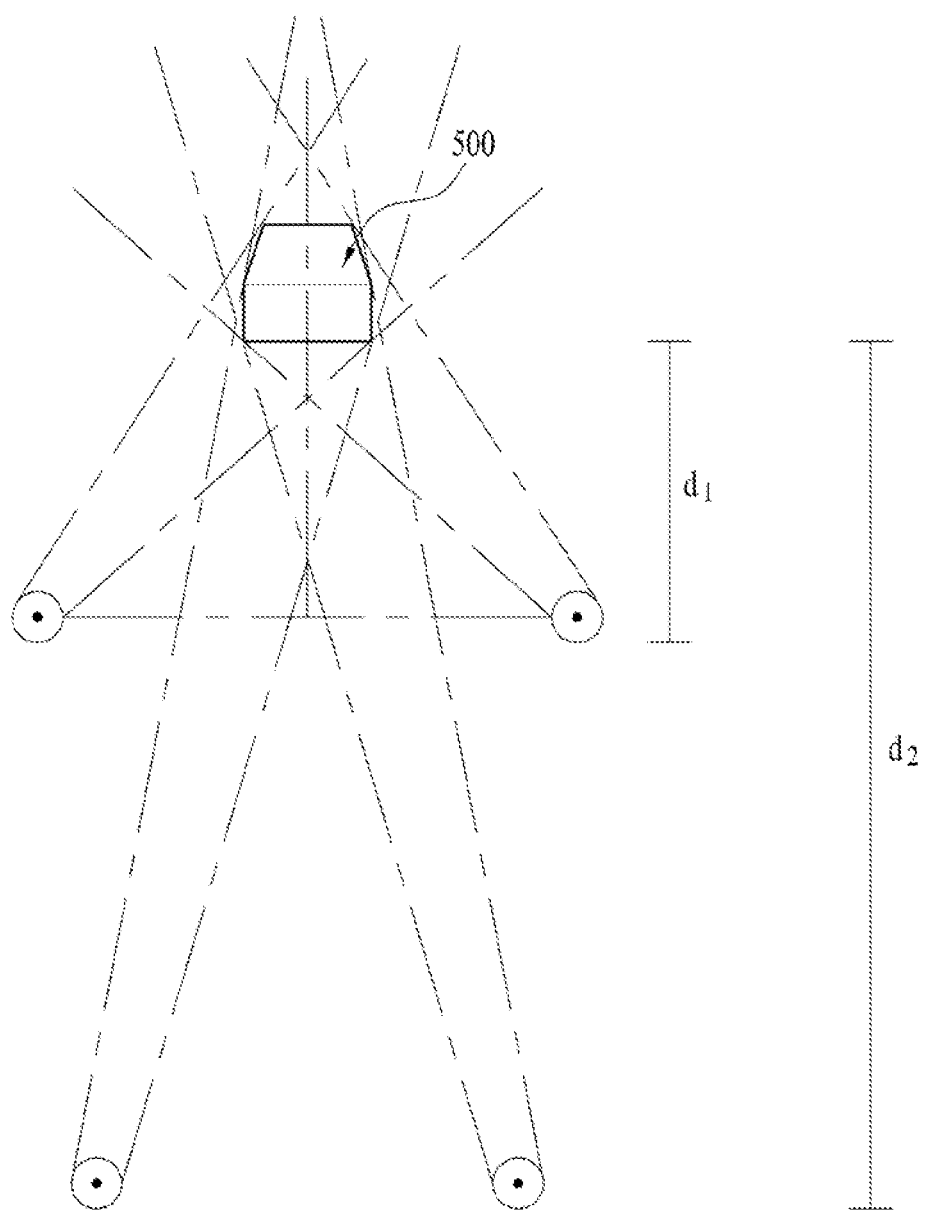
FIG. 4 is a diagram for describing the concept of a sense of distance and 3D depth attributed to binocular disparity.

FIG. 4 is a diagram for concept of a sense of distance and 3D depth attributed to binocular disparity.

Referring to FIG. 4, a lateral side ratio of an image entering each eyeball in view of a hexahedron 400 in a distance d1 trough both eyes is relatively higher than that in a distance d2, whereby a difference between images seen through both eyes increases. Moreover, an extent of a stereoscopic effect sensed by a user in view of the hexahedron 400 in the distance d1 can become higher than that in view of the hexahedron 400 in the distance d2. In particular, when a thing is seen through both eyes of a user, a closer subject gives a greater 3D effect, whereas a farther subject gives a smaller 3D effect.

Such a difference in 3D effect can be digitized into a 3D depth or a 3D level. In the following description, a high 3D effect of a thing situated closer shall be represented as a low 3D depth and a low 3D level. And, a low 3D effect of a thing situated farther shall be represented as a high 3D depth and a high 3D level. As the definition of the 3D depth or level is relatively set, a classification reference for the 3D depth or level and an increasing/decreasing direction of the 3D depth or level is changeable.

A method of implementing a stereoscopic 3D image is described as follows.

First of all, as mentioned in the following description, in order to implement a stereoscopic 3D image, an image for a right eye and an image for a left eye need to arrive at both eyes in a manner of being discriminated from each other. To this end, a parallax barrier scheme is explained as follows.

The parallax barrier scheme enables different images arrive at both eyes in a manner of controlling a propagating direction of light by electrically driving a cutoff device provided between a general display and both eyes.

This is explained with reference to FIG. 5 as follows.

Figure 5:
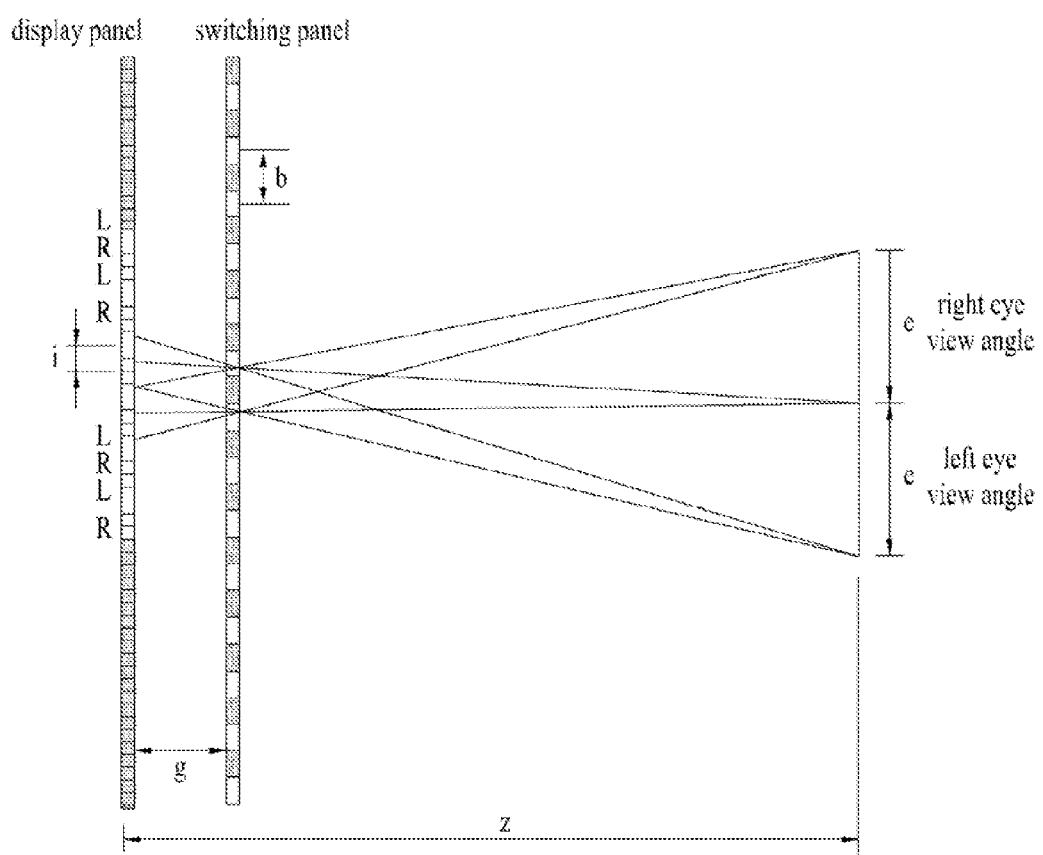
FIG. 5 is a diagram for describing the principle of a stereoscopic 3D image displaying method using binocular disparity applicable to embodiments of the present invention.

FIG. 5 is a diagram for describing the principle of a stereoscopic 3D image displaying method using binocular disparity applicable to embodiments of the present invention.

Referring to FIG. 5, in order to display a stereoscopic 3D image, the display unit 151 may include a display panel and a switching panel attached to a top surface of the display panel. The switching panel is electrically controllable and is able to partially cut off or transmit lights to arrive at both eyes. In particular, the display panel may include such a general display device as LCD, LED, AMOLED and the like.

In FIG. 5, 'b' indicates a barrier space of a switching panel, 'g' indicates a gap between a switching panel and a display panel, and 'z' indicates a distance between an eye view position and a display panel. When two images are synthesized by a pixel unit (L, R), as shown in FIG. 5, the switching panel may operate in a manner that a view angle of a right eye and a view angle of a left eye correspond to a pixel included in the right image and a pixel included in the left image, respectively.

In case of attempting to output a stereoscopic 3D image, the switching panel is turned on to separate incident view angles from each other. In case of attempting to output a 2D image, the switching panel is turned off to let the incident view angle pass through. Hence, if the switching panel is turned off, binocular disparity is not separated. The above-configured switching panel facilitates a switching between 2D and 3D, thereby enabling a user to advantageously appreciate a stereoscopic 3D image without wearing polarizing glasses or active-shutter type glasses.

FIG. 5 shows that the parallax barrier works in one axial direction for example, by which the present invention may be non-limited. Alternatively, the present invention may adopt a parallax barrier capable of working in at least two axial directions in accordance with a control signal generated by the controller 180.

For clarity of the following description, assume that an image display apparatus mentioned in the following may include at least one of the components shown in FIG. 1. In particular, a mobile terminal, to which the present invention is applicable, may include a display unit configured to selectively provide a stereoscopic 3D image to a user by the above-mentioned 3D parallax barrier technique.

A general stereoscopic 3D image photographing technique may be categorized into a two-camera photographing technique using two cameras and a single-camera photographing technique using a single camera.

According to the two-camera technique, a left image and a right image of a subject are photographed by maintaining a constant interval between two lenses of the two cameras and are then created into a 3D image viewable on a 3D display using a computer.

According to the single camera technique, a left image of a subject is photographed via a camera, the camera is moved in a constant interval, and a right image of the subject is then photographed via the camera.

Thus, in case of using two cameras, a user may be able to create a 3D image by photographing at one position only. Yet, in order to create a 3D image using a single camera, the corresponding camera should be moved for photographing. If so, it may be difficult for a user to exactly obtain a plurality of photographing positions. In order to overcome such difficulty, a method of providing photographing positions to a user is required for a case of creating a 3D image suing a single camera. To this end, the present invention provides a user with a method of facilitating a 3D image to be created.

Figure 6:
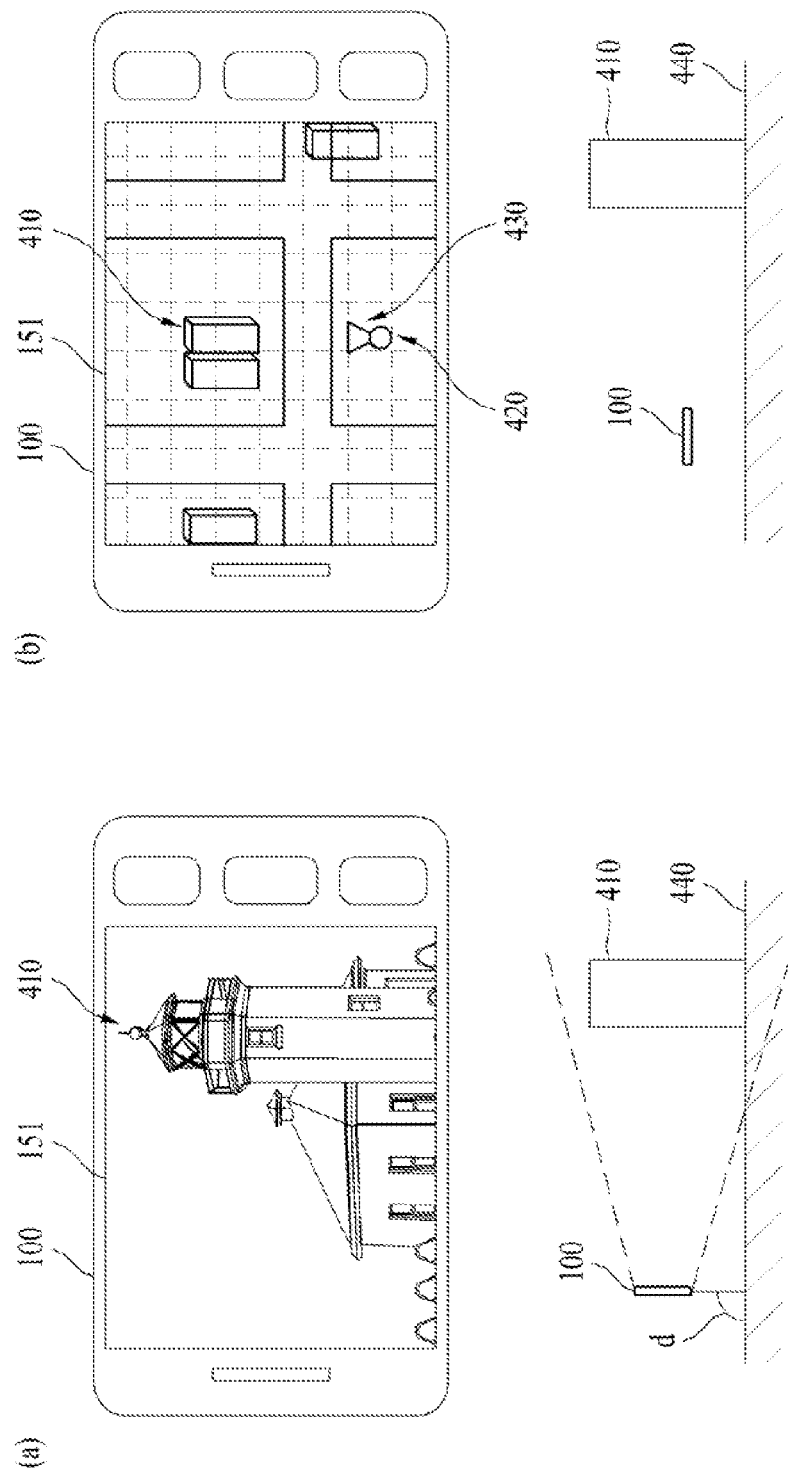
FIG. 6 is a diagram for one example of a 3D image photograph mode according to one embodiment of the present invention.

FIG. 6 is a diagram for one example of a 3D image photograph mode according to one embodiment of the present invention.

FIG. 6 (a) shows a mode of photographing a subject actually (hereinafter named a subject photograph mode). FIG. 6 (b) shows a mode of enabling a user to select a subject to photograph and indicating a photographing position (hereinafter named a subject select mode).

The drawing in an upper part of FIG. 6 (a) illustrates a mobile terminal 100 having a subject 410 displayed on a display unit 151. In particular, the subject photograph mode may be implemented in the same manner of a general photograph mode. And, the mobile terminal 100 displays a view of photographing the subject 410 via the display unit 151, whereby a user is able to recognize the photographing process. The subject photograph mode may further include a photograph icon, a camera shutter setting icon, a zoom function setting icon, a camera change icon and other option icons.

The drawing in an upper part of FIG. 6 (b) illustrates a mobile terminal 100 having its current location and a subject 410 displayed on a display unit 151. A circle 420 displayed on the display unit 151 may indicate the current location of the mobile terminal 100. And, a triangle symbol 430 attached to the circle 420 may indicate a direction of the mobile terminal 100. In particular, the circle 420 and the triangle symbol 430 may indicate that the mobile terminal 100 faces in direction originating from the circle 420 toward a side of the triangle symbol opposing the circle 420. In FIG. 6 (b), it can be observed that the mobile terminal 100 is facing in top direction, i.e., toward the subject 410.

In the subject select mode, a map image covering a predetermined area from a point at which the mobile terminal 100 is currently located. The mobile terminal 100 may be able to display a map image, which is saved in the mobile terminal 100 or obtained via an external network, based on the current location information of the mobile terminal confirmed via the position location module 115.

In the subject select mode, a subject is selected from the displayed map image by a user and a photographing location for a user's photographing is then displayed in order to create a 3D image by photographing the selected subject.

Drawings shown in lower parts of FIG. 6 (a) and FIG. 6 (b) show lateral views of the mobile 100 and the subject 410, respectively.

The drawing shown in the lower part of FIG. 6 (a) shows a case that the mobile terminal 100 is set vertical to a ground 440. The drawing shown in the lower part of FIG. 6 (b) shows a case that the mobile terminal 100 is set in parallel with the ground 440. An indication 'd' means an angle between the ground 400 and the mobile terminal 100. In the following description, assume that a camera of the mobile terminal 100 is installed on a front or rear side of the mobile terminal 100.

The mobile terminal 100 checks the inclination 'd' of the mobile terminal 100 with the ground 440 via the motion sensor 142 and may be then able to switch the subject photograph mode and the subject select mode to each other automatically in accordance with the inclination 'd' of the mobile terminal 100 with the ground 440.

In particular, when a user takes a shot of a subject, the user generally looks at the subject in front view. Hence, if the mobile terminal 100 is set vertical to the ground, as shown in FIG. 6 (a), the mobile terminal 100 automatically enters the subject photograph mode. Moreover, if the mobile terminal 100 is set in parallel with the ground, as shown in FIG. 6 (b), the mobile terminal 100 automatically enters the subject select mode. In doing so, by setting a value of the inclination 'd' of the mobile terminal 100 with the ground 440, it may be able to change a condition for switching each of the 3D image photograph modes.

Moreover, the subject photograph mode and the subject select mode may be set to be switched to each other in response to a user's input. This setting may cope with a case that a user attempts to photograph a subject in the below by laying the mobile terminal 100 down in parallel with the ground. In this case, the mobile terminal 100 may be able to output an icon, which is provided to perform a mode switching operation in the subject photograph mode and/or the subject select mode, to the display unit 151.

Figure 7:
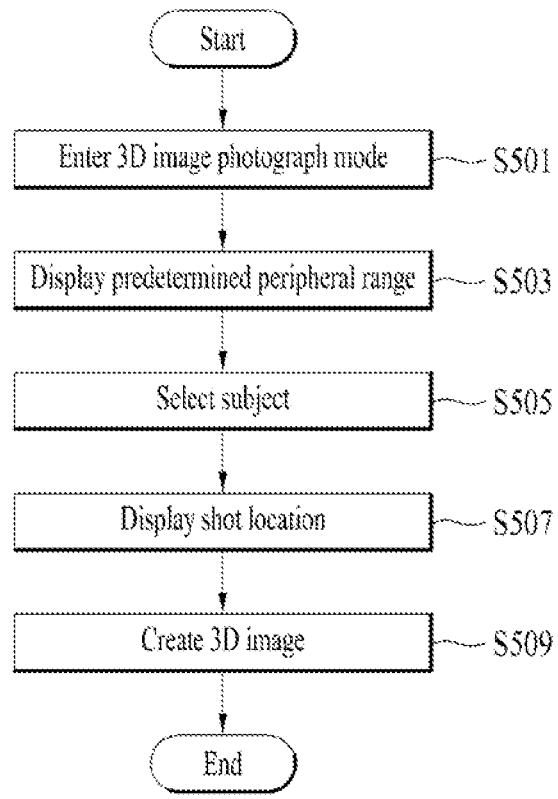
FIG. 7 is a flowchart for a method of creating a 3D image according to one embodiment of the present invention.

FIG. 7 is a flowchart for a method of creating a 3D image according to one embodiment of the present invention.

Referring to FIG. 7, if a 3D image photograph mode is selected by a user, the mobile terminal 100 enters a 3D image photograph mode [S501]. In this case, as mentioned in the foregoing description, the 3D image photograph mode may include the subject photograph mode and the subject select mode. For clarity and convenience, the following description may assume the subject select mode only.

After the mobile terminal 100 has entered the 3D image photograph mode (e.g., subject select mode), it may output an image (e.g., a map) of a predetermined area with reference to a current location of the mobile terminal 100 [S503]. In doing so, the map of the area around the mobile terminal 100 may be outputted in detail or schematically in accordance with a reduced scale. In particular, the reduced scale of the map may be changeable in response to a user's selection input.

The mobile terminal 100 receives a selection of a subject to photograph in the map image of the area round the mobile terminal 100 from the user [S505]. In doing so, the user may select a specific location or point, a specific direction, or a prescribed area as the subject.

Subsequently, the mobile terminal 100 outputs a location or range, which should be photographed by the user to create a 3D image of the subject selected by the user, via the display unit 151 [S507]. In doing so, the mobile terminal 100 may output the photograph range with reference to the current location of the mobile terminal 100. In particular, assuming a case that the subject is photographed at the currently located point of the mobile terminal 100, it may be able to output the photograph range required for creating a 3D image using the image photographed at the current point. Moreover, if a user selects a point at which the subject will be photographed, assuming a case that the subject is photographed at the corresponding point, the mobile terminal 100 may be able to output the photograph range required for creating a 3D image using the image photographed at the corresponding point.

Thereafter, if the user photographs the subject at all locations (or range) indicated by the mobile terminal 100, the mobile terminal 100 may be able to create a 3D image by combining and processing the photos photographed by the user together [S509].

In the following description, examples of implementing the subject select mode are explained with reference to the corresponding drawings, in each of which the display unit 151 is schematically illustrated without the case of the mobile terminal 100.

Figure 8:
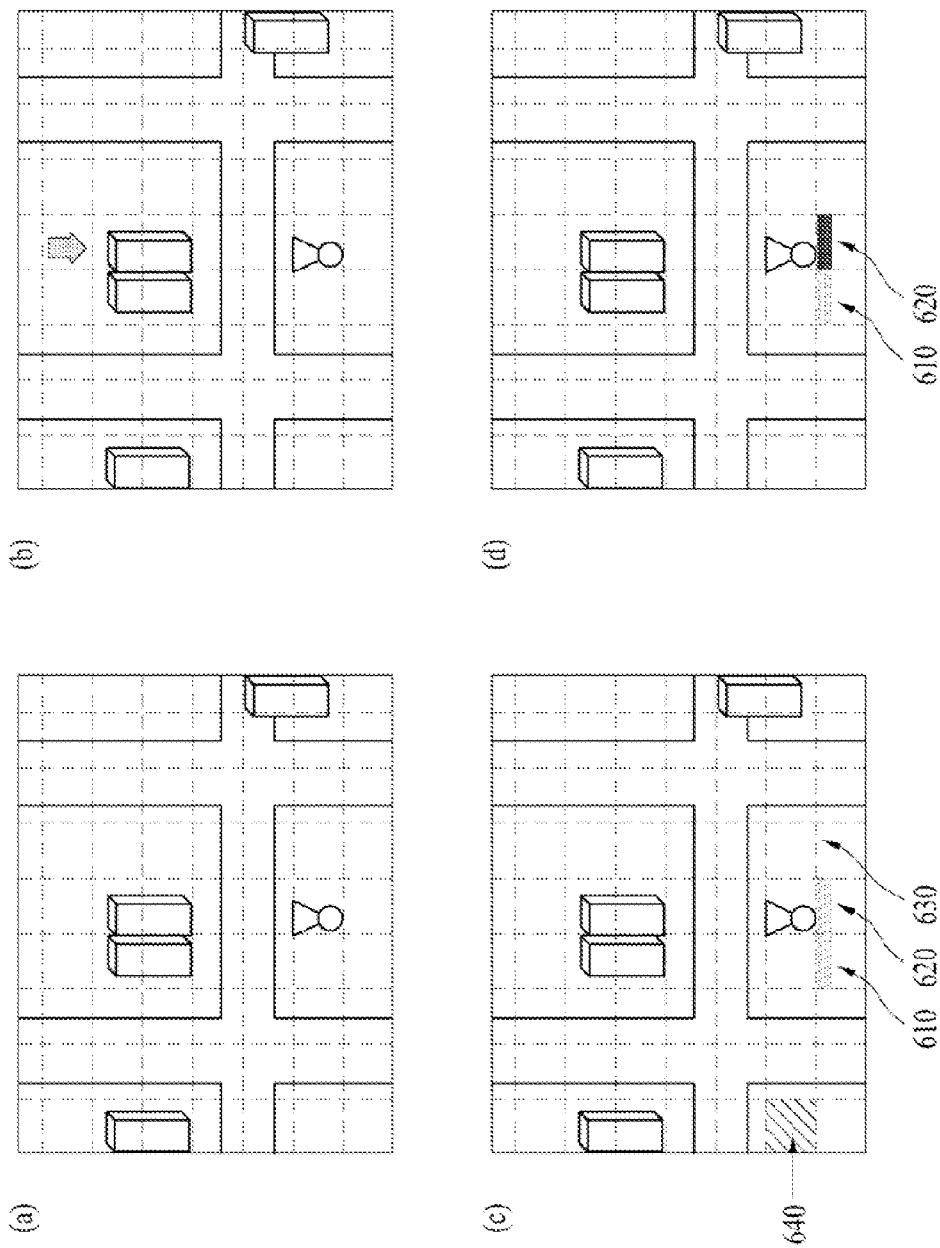
FIGS. 8 to 12 are diagrams for examples of a subject select mode according to one embodiment of the present invention.

FIG. 8 is a diagram for one example of a subject select mode according to one embodiment of the present invention.

Referring to FIG. 8, FIG. 8 (a) corresponds to the step S503 shown in FIG. 7, FIG. 8 (b) corresponds to the step S505 shown in FIG. 7, and FIG. 8 (c) and FIG. 8 (d) correspond to the step S507 shown in FIG. 7.

FIG. 8 (a) shows an initial screen when a subject select mode is entered. In FIG. 8 (a), solid lines indicate a map image outputted to the display unit 151 of the mobile terminal 100, a location symbol of the mobile terminal 100, a direction symbol of the mobile terminal 100.

For convenience, dotted lines are provided for partitions to inform a user of a shot location. The partitioning dotted line may become a unit of indicating a location at which a user takes a shot. In particular, a count for the mobile terminal 100 to photograph a subject on one partitioning line (or box) may become 1. The dotted lines may be optionally displayed. For clarity and convenience of the following description, assume that the dotted lines are displayed. Moreover, if the mobile terminal 100 supports the optional representation of the dotted lines, whether to display the dotted lines may be determined in accordance with a user's setting.

FIG. 8 (B) shows a screen in which a user has selected a subject. In FIG. 8 (b), an arrow indicates the subject selected by the user. To this end, the user may select the subject using one of a touch input, a proximity touch and the like. As mentioned in the foregoing description, the subject may include a prescribed range. For clarity of the following description, assume that a specific point or building is selected.

FIG. 8 (c) shows a range 610 and 620 of user's photographing to create a 3D image for the subject. As mentioned in the foregoing description, assuming that the photographing is performed at a currently located point of the mobile terminal 100, a location required for creating a 3D image may be displayed together with an image photographed at the corresponding point. In particular, the mobile terminal 100 may be able to create a 3D image by combining images of the subject photographed at the current location including the point 620 and the point 610 via the mobile terminal 100. Moreover, the mobile terminal 100 may represent the range of photographing for the creation of the 3D image as the point 620 and the point 630. In FIG. 8, although the mobile terminal 100 marks the photograph location on the partitioning lines, the photograph location may be represented as a box 640 constructed with the partitioning lines.

The mobile terminal 100 may be able to calculate the photograph range using a distance between a current location of the mobile terminal 100 and a location of a subject, a horizontal size of a virtual screen surface (i.e., depth zero), a focal distance of a camera lens, a screen disparity for determining a depth level, a horizontal size of a camera sensor, a horizontal size of a 3D display and the like. In particular, a distance between a current location of the mobile terminal 100 and a location of a subject may be calculated in a manner of obtaining the current location of the mobile terminal 100 and the location of the selected subject from a map image and then performing calculation using a reduced scale of the map image. Other values may be calculated by general methods and their details shall be omitted from the following description.

FIG. 8 (d) shows a screen on which a photograph range is represented after photographing a portion of the photograph range 610/620 indicated by the mobile terminal. The point 620, at which the photographing has been performed via the mobile terminal 100, may be displayed in a manner of differing from the original photograph range 610 and 620 in display color, display shape and the like. The other point 610, at which the photographing has not been performed via the mobile terminal 100, may be displayed in a manner of being identical to the original photograph range 610 and 620 in display color, display shape and the like. The mobile terminal 100 obtains a location of the mobile terminal 100 via the position location module 115. If the mobile terminal 100 is located at the point on which the photographing is not performed yet via the mobile terminal 100, the mobile terminal may output an indication signal. In particular, if a user arrives at the point on which the photographing is not performed yet in the course of moving by holding the mobile terminal 100, the mobile terminal 100 may output the indication signal to be perceived by the user. In this case, the indication signal may include at least one of a sound, an image, a vibration and the like.

After the photographing has been finished, if a subject is photographed at the point 610 on which the photographing is not performed, the mobile terminal 100 may be able to determined whether a 3D image can be created by comparing the image photographed at the point 620 to the image photographed at the point 610. In doing so, the mobile terminal 100 may be able to compare shaking extents of the images to each other by analyzing a focus of t a camera. In particular, the comparison may be performed in a manner of checking whether the subject in the image photographed at each of the point 620 and the point 610 is in focus, whether the focus of each of the images is identical, and the like. Moreover, it may be able to compare the image photographed at the point 620 and the image photographed at the point 610 to each other in photograph mode, the number of pixels and the like. In particular, it may be able to determine an exposure level using sensitivity, an iris diaphragm, a shutter and the like when each of the images is photographed. Moreover, it may be able to compare the numbers of pixels of the images to each other.

Thus, the mobile terminal 100 determines whether the respective images are photographed on the same conditions in a manner of comparing the respective images to each other. If the respective images are not photographed on the same conditions, the differences can be displayed on the display unit 151 of the mobile terminal 100. In doing so, since the latter image does not have the same conditions of the former image despite being photographed, it may be displayed in a manner of differing from the photographing-finished point and/or the photographing-not-finished point in display color, display shape and the like.

The respective images may be compared to each other in time order. In particular, with reference to an image photographed in the first place, it may be able to determine whether an image photographed after the image photographed in the first place is photographed on the same condition of the initially photographed image. Moreover, after a random one of the respective images has been selected as a reference image, other images may be compared to the reference image.

Figure 9:
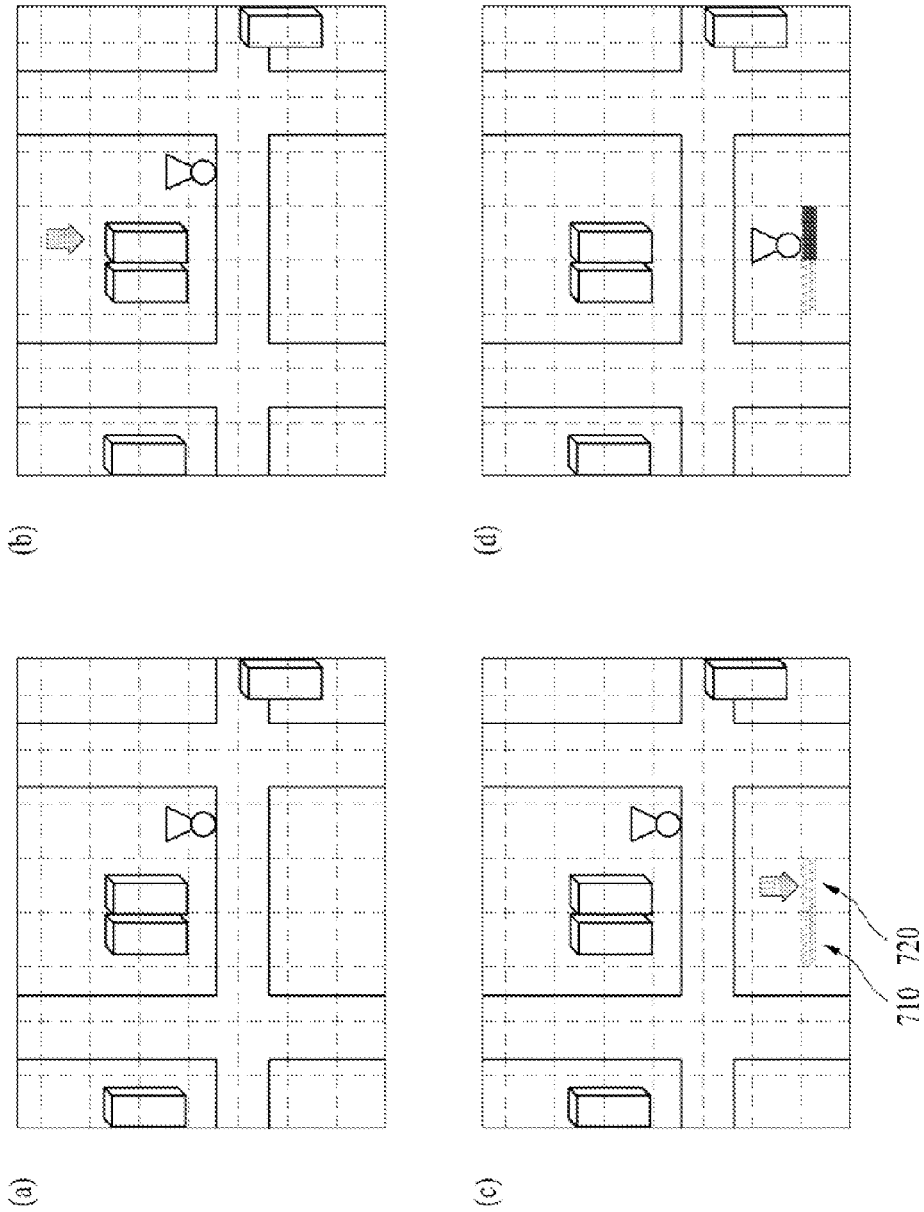

FIG. 9 is a diagram for one example of a subject select mode according to one embodiment of the present invention. FIG. 9 shows a case that the mobile terminal 100 additionally receives a selection of a point, at which a user attempts to perform a photographing, from the user. The same description with reference to FIG. 8 shall be omitted from the following description.

Referring to FIG. 9, FIG. 9 (a) corresponds to the step S503 shown in FIG. 7, FIG. 9 (b) corresponds to the step S505 shown in FIG. 7, and FIG. 9 (c) and FIG. 9 (d) correspond to the step S507 shown in FIG. 7.

FIG. 9 (c) shows a screen in which a point 720 is selected by a user to perform a photographing. In particular, although a current location of the user is different from the point 720, if the point 720 to perform a photographing is selected, assuming that the photographing is performed on the selected point 720, it may be able to set up a location required for creating a 3D image together with an image photographed at the corresponding point. In particular, the mobile terminal 100 may be able to create the 3D image by combing the image of the subject photographed at the point 720 selected by the user and the image of the subject photographed at the point 710 selected by the user with each other.

Figure 10:
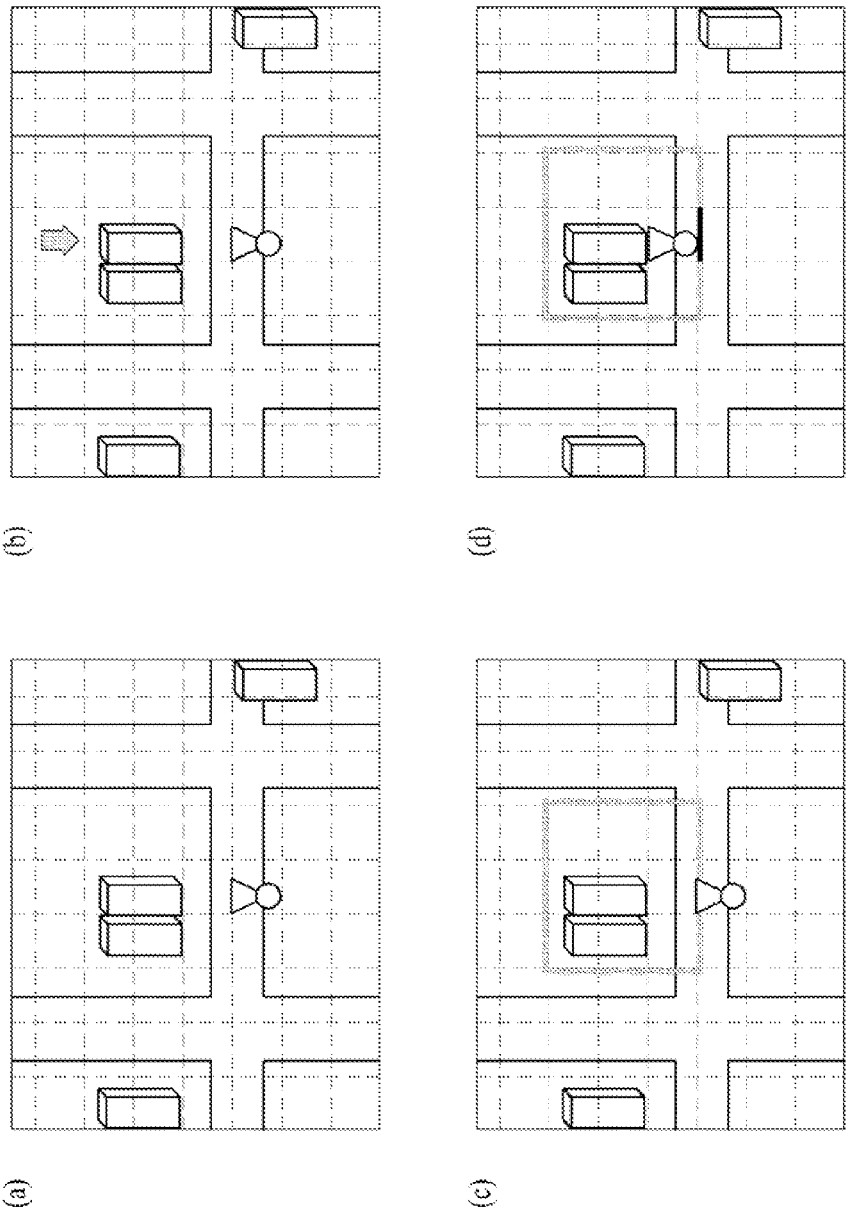

FIG. 10 is a diagram for one example of a subject select mode according to one embodiment of the present invention. FIG. 10 shows a case that the mobile terminal 100 displays a photograph range in all directions with reference to a selected subject. The same description with reference to FIG. 8 shall be omitted from the following description.

FIG. 10 (c) shows a screen of displaying a range for a user to photograph a subject to create a 3D image of the subject. If a user selects a subject, the mobile terminal 100 may display a photograph range set to all directions (e.g., top direction, bottom direction, right direction and left direction) for photographing the subject. In doing so, like the former embodiment described with reference to FIG. 8, the photograph range may be displayed in a manner of being set with reference to a current location of the mobile terminal 100. Alternatively, like the former embodiment described with reference to FIG. 9, after a point for performing a photographing has been selected by a user, the photograph range may be displayed in a manner of being set with reference to the selected point. The case shown in FIG. 10 relates to the case that the user has selected the point for performing the photographing together with the subject.

Figure 11:
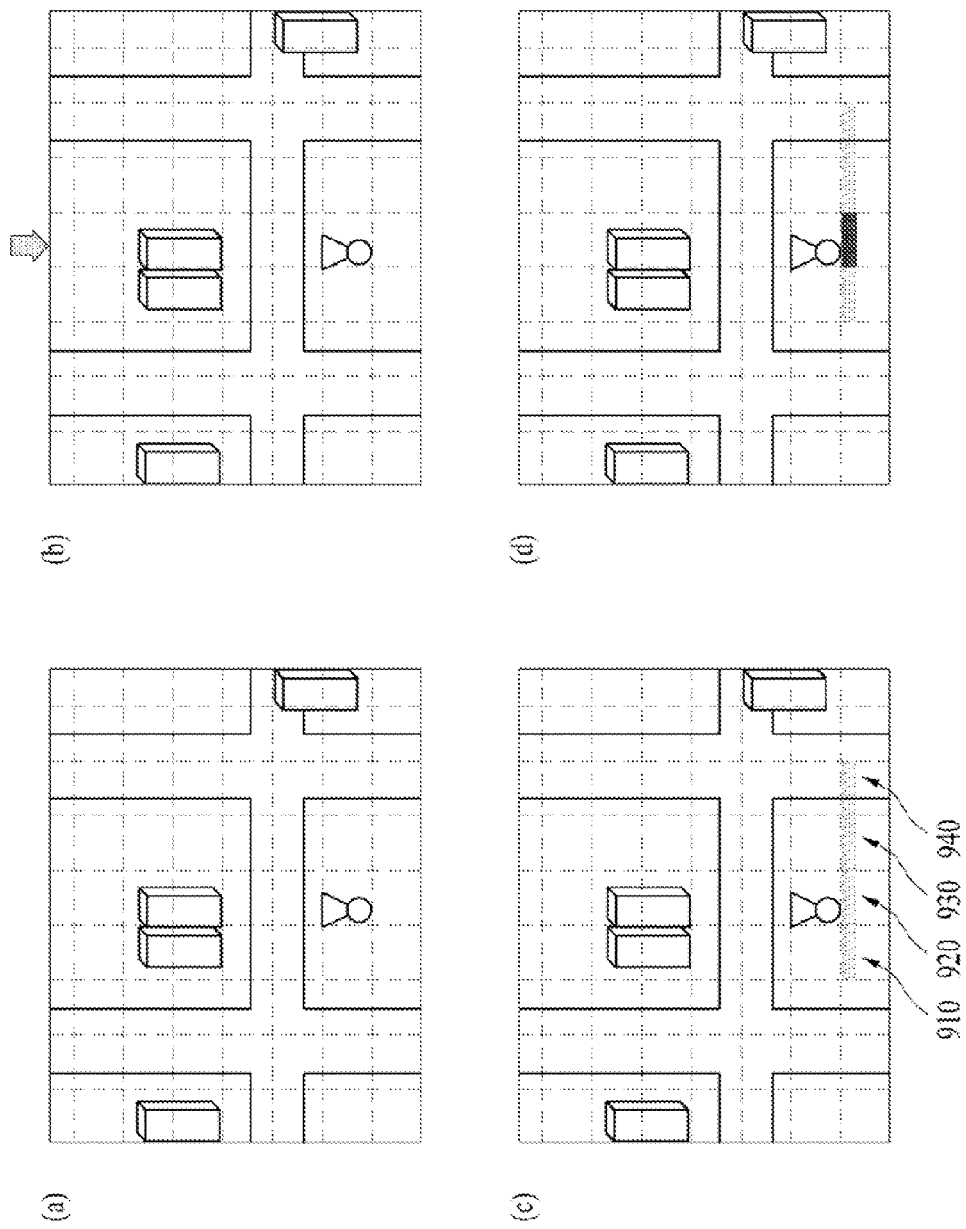

FIG. 11 is a diagram for one example of a subject select mode according to one embodiment of the present invention. FIG. 11 shows a case that the mobile terminal 100 receives a selection of a direction from a user instead of a point for performing a photographing. The same description with reference to FIG. 8 shall be omitted from the following description.

FIG. 11 (b) shows a screen in which a direction for performing a photographing is selected by a user. In FIG. 11 (b), an arrow indicates the direction selected by the user.

FIG. 11 (c) shows a screen on which a range 910, 920, 930 and 940 for performing a photographing to create a 3D image of a subject is displayed. In doing so, like the former embodiment described with reference to FIG. 8, the photograph range may be displayed in a manner of being set with reference to a current location of the mobile terminal 100. Alternatively, like the former embodiment described with reference to FIG. 9, after a point for performing a photographing has been selected by a user, the photograph range may be displayed in a manner of being set with reference to the selected point.

Figure 12:
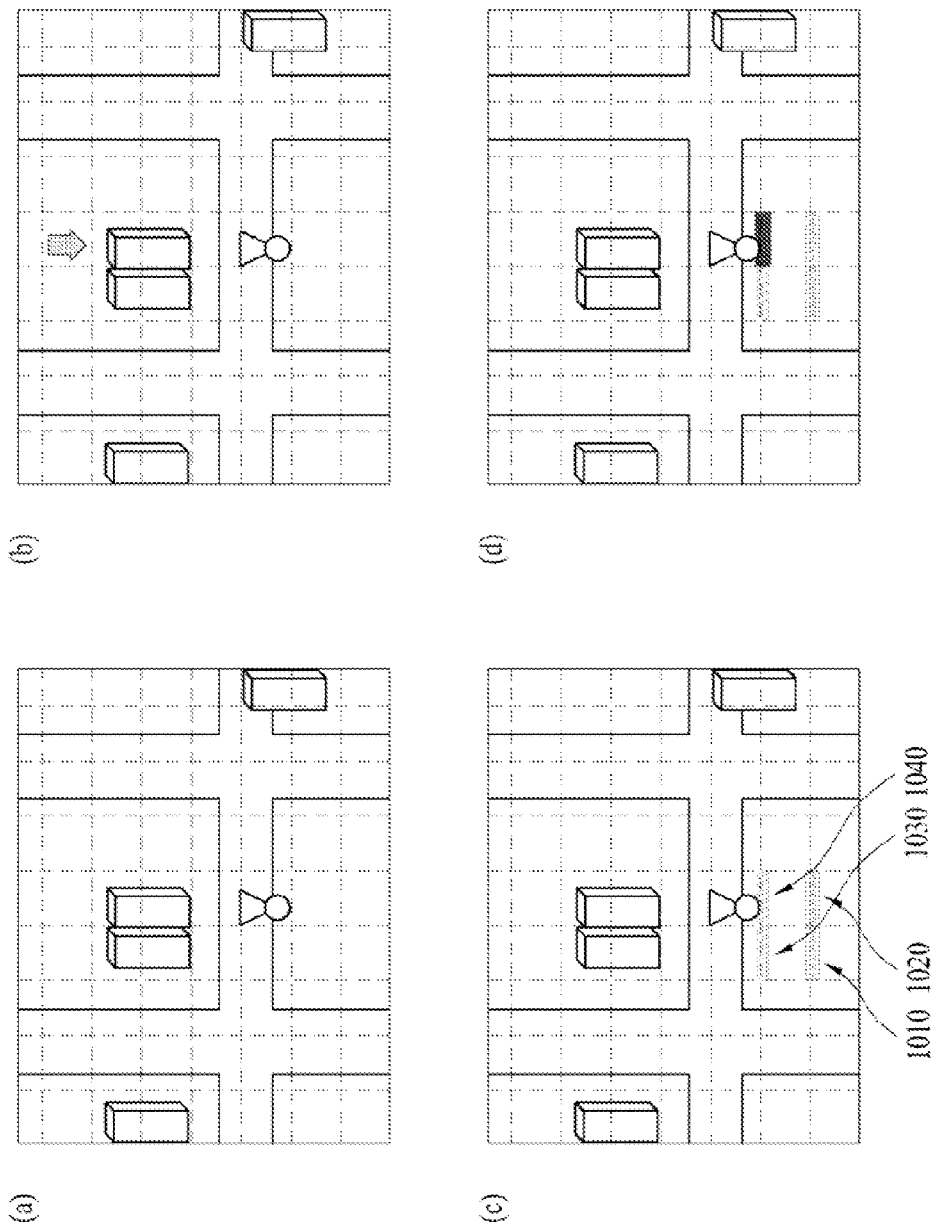

FIG. 12 is a diagram for one example of a subject select mode according to one embodiment of the present invention. FIG. 12 shows a case that the mobile terminal 100 displays a plurality of photograph ranges. The same description with reference to FIG. 8 shall be omitted from the following description.

FIG. 21 (c) shows a screen on which a range 1010, 1020, 1030 and 1040 for performing a photographing to create a 3D image of a subject is displayed. The point 1010/1020 indicates a photographing location farther than the point 1030/1040 from a subject. In particular, the mobile terminal 100 creates one 3D image by combining and processing the image photographed at the point 1010 and the image photographed at the point 1020 together and also creates another 3D image by combining and processing the image photographed at the point 1040 and the image photographed at the point 1030 together. Thus, the mobile terminal 100 creates a plurality of the 3D images and then provides a user with a zoom function implemented on the 3D images.

FIG. 13 is a diagram for one example of a zoom function applied to a 3D image according to one embodiment of the present invention.

Referring to FIG. 13 (a), the mobile terminal 100 displays a 3D image on the display unit 151 and may additionally display an icon for providing a zoom function on right top corner of the display unit 151. In the zoom function icon, an icon '+' may provide a function of enlarging a 3D image and an icon '−' may provide a function of reducing the 3D image.

The mobile terminal 100 stores a plurality of 3D images created by photographing the same subject at different points. If the mobile terminal 100 receives an input of the zoom function icon, it may output a 3D image by zoom-in or zoom-out.

FIG. 13 (b) shows a screen for outputting a 3D image having a subject enlarged via the icon '+' shown in FIG. 13 (a). On the contrary, FIG. 13 (c) shows a screen for outputting a 3D image having a subject reduced via the icon '−' shown in FIG. 13 (a).

Meanwhile, a user may prefer to display a stereoscopic 3D space image created from synthesizing a plurality of right and left eye images obtained in accordance with a user's taste.

In case of a 2D image, consecutively photographed 2D images are synthesized horizontally or vertically, whereby a single image may contain more scenes and screens.

It may be able to consider displaying a stereoscopic 3D space image by applying a technique for a 2D image. If so, since a convergence point of each scene differs and a spatial perception differs correspondingly, it is difficult to display the stereoscopic 3D space image by the conventional image synthesizing technique.

Therefore, the present invention proposes a method of providing a stereoscopic 3D space image created in a manner of obtaining a plurality of right and left eye images consecutively in preset interval and then synchronizing and synthesizing the obtained images together.

In the following description, in order to discriminate a stereoscopic 3D image created by the present invention form a general stereoscopic 3D image, the stereoscopic 3D image created by the present invention shall be named a 3D space image.

Figure 14:
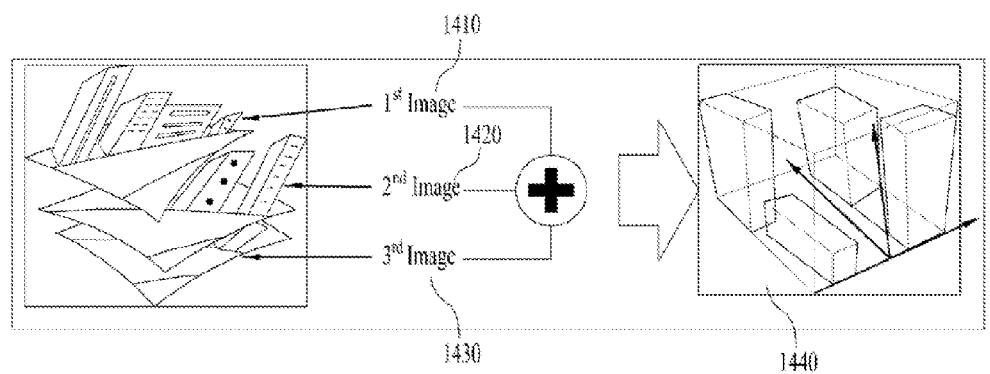
FIG. 14 is a diagram for one example of creating a stereoscopic 3D space image by synchronizing and synthesizing a plurality of consecutively obtained images according to one embodiment of the present invention.

FIG. 14 is a diagram for one example of creating a stereoscopic 3D space image by synchronizing and synthesizing a plurality of consecutively obtained images according to one embodiment of the present invention.

Referring to FIG. 14, a user may be able to obtain a plurality of 3D images 1410, 1420 and 1430 with reference to a prescribed reference. The controller 180 then controls a stereoscopic 3D space image to be created using a plurality of the obtained stereoscopic 3D space images 1410, 1420 and 1430.

In the following description, a method of creating a stereoscopic 3D space image and providing the created stereoscopic 3D space image to a user is explained in detail with reference to FIG. 15.

Figure 15:
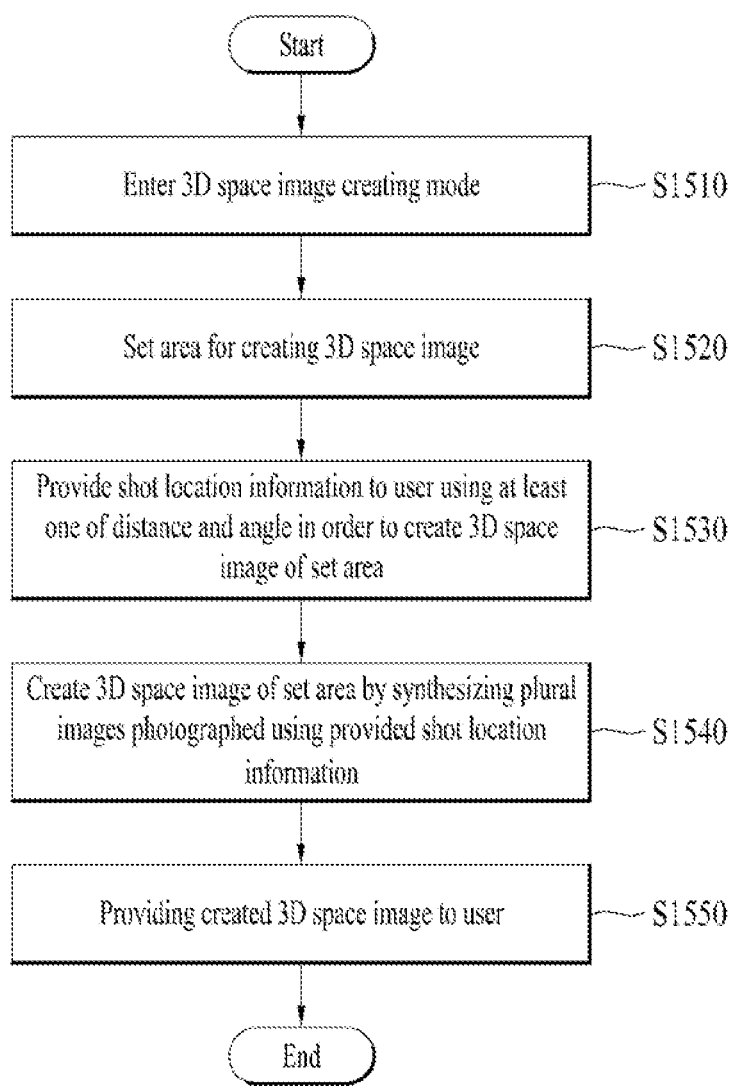
FIG. 15 is a flowchart for one example of a method of creating a 3D image using a plurality of consecutively obtained images according to one embodiment of the present invention.

FIG. 15 is a flowchart for one example of a method of creating a 3D image using a plurality of consecutively obtained images according to one embodiment of the present invention.

Referring to FIG. 15, a user is able to give a command for entering a stereoscopic 3D space image creating mode to create a stereoscopic 3D space image [S1510].

The stereoscopic 3D space image creating mode may be entered via one of a user's key button manipulation, a touch input of a preset specific pattern and the like.

For instance, if a user inputs a touch of a preset pattern in a general 2D image photograph mode or a stereoscopic 3D space image photograph mode, the controller 180 may control the mobile terminal 100 to enter the stereoscopic 3D space image creating mode in response to the user's touch.

Once the mobile terminal 100 enters the stereoscopic 3D space image creating mode, the controller 180 may control an information, which is provided for a user to set an area for creating a stereoscopic 3D space image, to be displayed on a prescribed region of the display unit 151 [S1520].

In particular, using the position location module 115, a user may be able to set a whole area or region in order to create a stereoscopic 3D space image with reference to a current location of the mobile terminal 100.

Yet, the step for a user to set an area for creating a stereoscopic 3D space image in advance is one example for implementing the present invention only. Without the step of setting an area in advance, it is apparent to those skilled in the art that a method of creating a stereoscopic 3D space image using a plurality of collected 3D images is applicable.

FIG. 16 is a diagram for one example of setting a region for creating a stereoscopic 3D space image according to one embodiment of the present invention.

FIG. 16 shows one example of displaying an information, which is provided for a user to set an area for creating a stereoscopic 3D space image, on a prescribed region of the display unit 151 on the assumption described with reference to FIG. 8.

Referring to FIG. 16 (a), a user may be able to set a $1^{st}$ area 1610 for creating a stereoscopic 3D space image via a key manipulation or a touch input manipulation with reference to a location 1620 of the user.

In FIG. 16 (a), the user is setting an area of a stereoscopic 3D space image to create with reference to a prescribed unit block.

Referring to FIG. 16 (b), a user may be able to set a $2^{nd}$ area 1620, which includes a location 1620 of the user centering on a specific object 1630, for creating a stereoscopic 3D space image via a key manipulation or a touch input manipulation.

In FIG. 16 (b), it may be able to set an area of a stereoscopic 3D space image to create with reference to a radius centering on the specific object 1630.

The description with reference to FIG. 16 is made on the assumption that a single area is set to create the stereoscopic 3D space image, which is just exemplary. And, it is apparent that a plurality of areas can be designated to create a stereoscopic 3D space image.

Referring now to FIG. 15, after the area for creating the stereoscopic 3D space image has been set, the controller 180 controls a shot location information to be provided to a user using at least one of a distance and an angle in order to create the stereoscopic 3D space image of the set area [S1530].

In order to create a stereoscopic 3D space image instead of a general stereoscopic 3D image, a plurality of stereoscopic 3D images photographed in a plurality of distances and at a plurality angles are required for a single object.

Hence, in order to obtain a plurality of the required stereoscopic 3D images, the controller 180 may control an information on a location for performing a photographing via the camera 121 to be displayed on a prescribed region of the display unit 151 using at least one of a distance and an angle.

The shot location information may be displayed with reference to the area previously set for creating the stereoscopic 3D space image in the step S1520 or the selected object.

In the following description, one example of displaying a shot location information with reference to the area previously set for creating the stereoscopic 3D space image in the step S1520 is explained with reference to FIG. 17.

FIG. 17 is a diagram for one example of providing shot location information to a user using at least one of a distance and an angle according to one embodiment of the present invention.

In particular, FIG. 17 (a) shows one example of displaying and providing a shot location information to a user using a distance.

Referring to FIG. 17 (a), in order to create a stereoscopic 3D space image for the area previously set in the step S1520, a location information for a user to perform a photographing via the camera 121 is displayed in a rectangular frame form on a prescribed region of the display unit 151.

And, the controller 180 may control a direction information 1730 on a direction, in which a user has to move in addition, to be displayed in addition.

In particular, centering on the current location of the mobile terminal 100, the controller 180 controls individual informations 1710 and 1720 for the photographing to be displayed on a prescribed region of the display nit 151 together with the direction information 1730 on the direction in which the user has to move.

Once the user moves in accordance with the direction information 1730, a location information for a new photographing is additionally updated and displayed on a prescribed region of the display unit 151.

Moreover, a distance interval for displaying each location information may be set in advance by a terminal manufacturer or may be changed randomly by a user. For instance, a threshold distance interval for displaying each location information may include 10 meters.

FIG. 17 (b) shows one example of displaying and providing a shot location information to a user using an angle.

Referring to FIG. 17 (b), in order to create a stereoscopic 3D space image for the area previously set in the step S1520, a location information for a user to perform a photographing via the camera 121 is displayed in a rectangular frame form on a prescribed region of the display unit 151.

And, the controller 180 may control a direction information 1730 on a direction, in which a user has to move additionally, to be displayed, as shown in FIG. 17 (a), in addition [not shown in the drawing].

In FIG. 17 (b), the controller 180 controls guide location informations on a plurality of stereoscopic 3D images, which should be photographed by a user at fixed locations, to be displayed in a manner of being discriminated by angles, respectively.

In particular, centering on a fixed location for a current scene viewed via the camera 121, a location information 1740 for a photographing at a $1^{st}$ angle and a location information 1750 for a photographing at a $2^{nd}$ angle are displayed.

In case that a location of the mobile terminal 100 is changed, a location information according to a newly updated angle may be displayed on a prescribed region of the display unit 151 in response to the changed location.

Yet, according to the description with reference to FIG. 17, the shot location information displaying method using the distance and the shot location information displaying method using the angle are discriminated from each other, which is just exemplary. Alternatively, it may be able to implement a shot location information displaying method using both a distance and angle together.

Moreover, as mentioned in the foregoing description, the shot location information may be displayed with reference to a selected object.

FIG. 18 is a diagram for one example of providing shot location information to a user centering on a specific object according to one embodiment of the present invention.

Referring to FIG. 18 (*a*), assume that a $1^{st}$ object is selected from a map.

If the $1^{st}$ object is selected, the controller 180 may control a location information 1810 on a location, at which a user has to photograph the $1^{st}$ object to represent as a stereoscopic 3D space image, to be displayed on the map.

FIG. 18 (*b*) shows one example of 3-dimensionally displaying and providing a shot location information on the selected object to a user.

Referring to FIG. 18 (*b*), a shot location information on a scene of viewing the $1^{st}$ object in front view, a shot location information on a scene of viewing the $1^{st}$ object in lateral view, and a shot location information on a scene of viewing the $1^{st}$ object in rear view are 3-dimensionally displayed, thereby further facilitating a user to recognize the corresponding location.

Using the displayed shot location informations, the user may be able to photograph a plurality of 3D images.

In dong so, the controller 180 may control a query information to be further displayed on a prescribed region of the display unit 151. In this case, the query information is provided to query whether to save a plurality of the photographed 3D images as general stereoscopic 3D space images or whether to save a plurality of the photographed 3D images to create a stereoscopic 3D space image.

Figure 19:
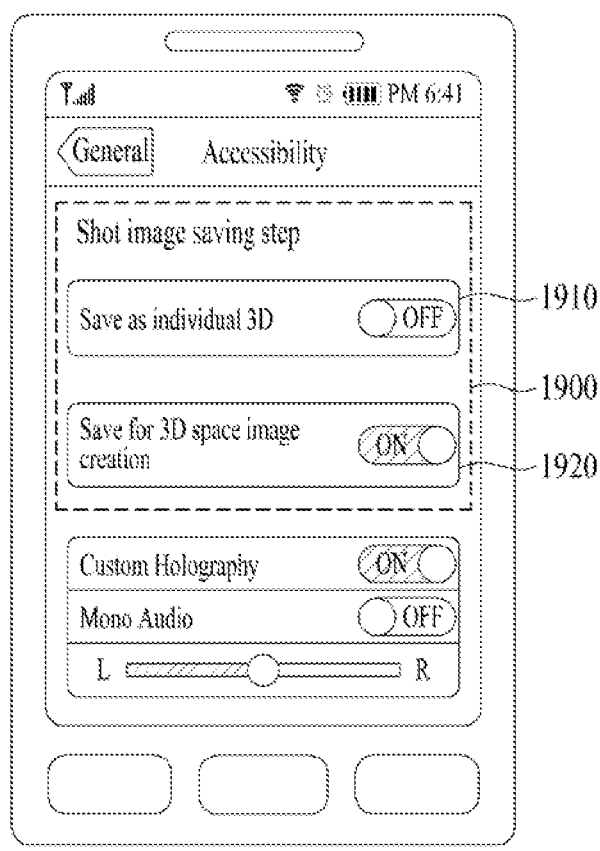
FIG. 19 is a diagram for one example of determining whether to save a shot image as a normal 3D image and whether to save the shot image for creating a stereoscopic 3D space image according to one embodiment of the present invention.

FIG. 19 is a diagram for one example of determining whether to save a shot image as a normal 3D image and whether to save the shot image to create a stereoscopic 3D space image according to one embodiment of the present invention.

Referring to FIG. 19, the controller 180 controls a shot image saving step menu 1910 to be displayed.

According to the shot image saving step menu 1910, it may be able to set up a function 1910 of saving a shot image as an individual 3D image and a function 1920 of saving a shot image to create a stereoscopic 3D space image.

Since the function 1920 of saving a shot image to create a stereoscopic 3D space image is active in FIG. 19, a plurality of the photographed 3D images are saved to create the stereoscopic 3D space image only.

Yet, in case that both of the function 1910 of saving a shot image as an individual 3D image and the function 1920 of saving a shot image to create a stereoscopic 3D space image are active together, a shot image may be further saved in a general gallery.

Referring now to FIG. 15, if a plurality of the images are photographed using the provided shot location informations, the controller 180 creates a stereoscopic 3D image of the set area by synthesizing a plurality of the hot images together [S1540].

In particular, using a plurality of the stereoscopic 3D images of the specific object photographed in prescribed interval or at prescribed angles, the stereoscopic 3D space image of the specific object is created. Moreover, using a plurality of the created stereoscopic 3D space images of a plurality of specific objects, a whole stereoscopic 3D space image within the area set by the user is created.

Subsequently, the controller 180 controls the created stereoscopic 3D space image to be provided to the user [S1550].

In particular, images included in a space of a predetermined range are synchronized together and are then synthesized into a 3D space, thereby creating a spatial panorama image having depth by escaping from the conventional restrictions put on a 2D image.

Therefore, a user can be provided with vivid scene information through the 3D space image as if viewing a real scene.

Moreover, the provided 3D space image is displayed in a manner of being rotated or zoomed in/out by a user's menu manipulation or a user's touch input of a specific pattern, thereby providing a user interface having a 3D effect better than that provided by the related art method.

In the following description, a process for providing a created 3D space image to a user via a display unit is explained with reference to FIGS. 20 to 22.

Figure 20:
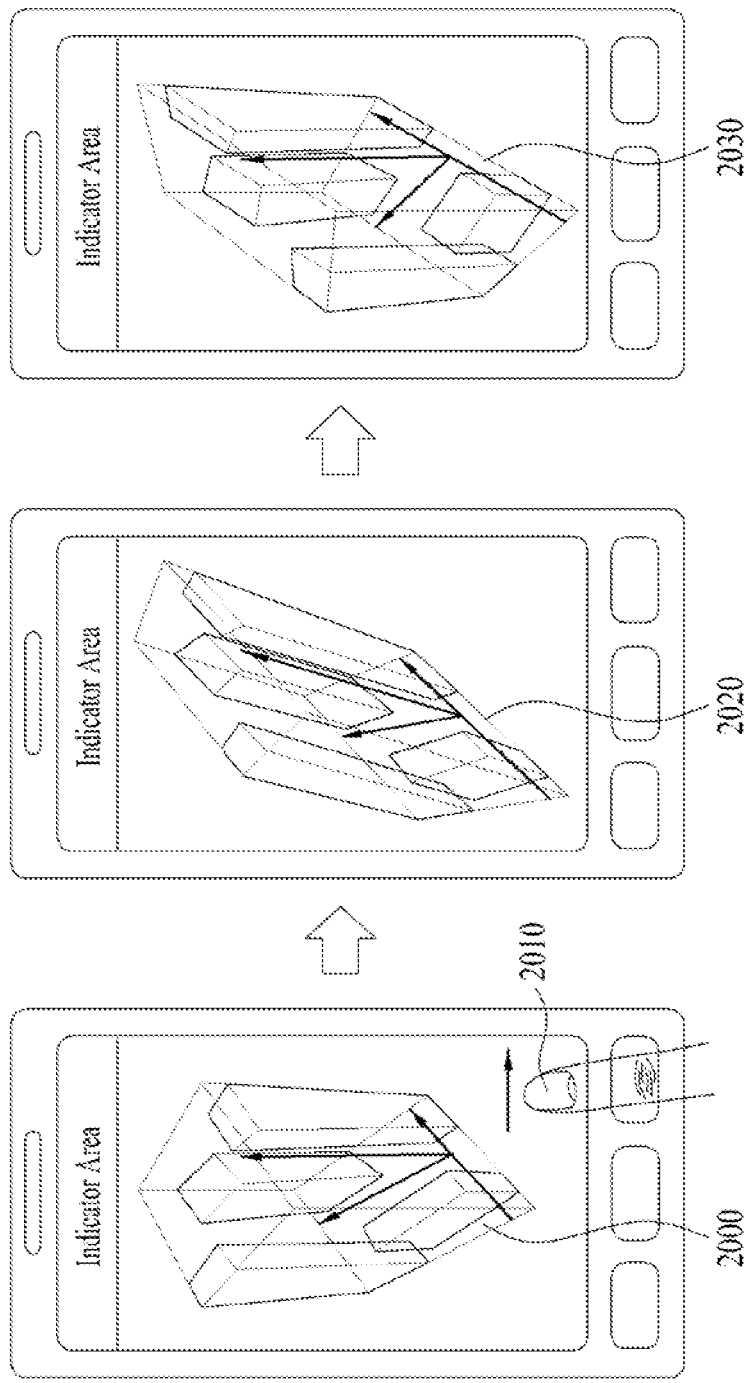
FIG. 20 is a diagram for one example of displaying a created stereoscopic 3D space image in a manner of rotating the stereoscopic 3D space image in response to a touch input according to one embodiment of the present invention.

FIG. 20 is a diagram for one example of displaying a created stereoscopic 3D space image in a manner of rotating the stereoscopic 3D space image in response to a touch input according to one embodiment of the present invention.

Referring to FIG. 20, a user performs a drag action 2010 on a provided 3D space image 200 in right direction, thereby controlling the 3D space image to be displayed in a manner of being rotated in response to the drag 2010.

In particular, the 3D space image 200 is displayed in a manner that a rotating speed and a rotating angle are changed in response to a level of the drag 2010 inputted by the user. In more particular, a stereoscopic 3D space image is displayed in a manner of being rotated from a $1^{st}$ scene 2000 to a $3^{rd}$ scene 2030 via a $2^{nd}$ scene 2020 in response to the drag 2010 inputted by the user.

According to the description with reference to FIG. 20, the user inputs a left-to-right drag only for example. Alternatively, the stereoscopic 3D image can be rotated in response to a top-to-bottom drag as well.

According to one embodiment of the present invention, a created stereoscopic 3D image may be displayed in a manner of being rotated in response to an inclination of a mobile terminal.

In particular, the controller 180 may be able to provide a created stereoscopic 3D image to a user in a manner of rotating the created stereoscopic 3D image 3-dimensionally in response to a mobile terminal inclination sensed by the sensing unit 140. In dong so, in order to sense the inclination of the mobile terminal, a gyro sensor may be usable.

In dong so, the controller 180 may control a speed of rotating the stereoscopic 3D image 3-dimensionally in response to the inclination. For instance, the stereoscopic 3D image may be provided to a user in a manner of rotating faster in proportion to the inclination.

Moreover, in case that the sensing unit 140 does not sense the inclination of the mobile terminal 100 any more, the controller 180 may provide the corresponding image to the user by stopping the rotation.

FIG. 21 is a diagram for one example of displaying a created stereoscopic 3D space image by rotating the created stereoscopic 3D image 3-dimensionally in response of an inclination of a mobile terminal according to one embodiment of the present invention.

Referring to FIG. 21 (a), a user is rotating a stereoscopic 3D space image 2000 in left direction by inclining the mobile terminal 100 at a prescribed angle 21110.

In particular, if the inclination of the mobile terminal 100 is sensed by the sensing unit, the stereoscopic 3D space image 2000 is displayed on a prescribed region of the display unit 151 by rotating into a $1^{st}$ image 2120 and a $2^{nd}$ image 2130 in order, as shown in FIG. 21 (b) while the inclination is recognized.

In FIG. 21, the stereoscopic 3D space image rotates in left direction only for example. Alternatively, the stereoscopic 3D space image may be able to rotate in one of right, top and bottom directions as well.

If the user increases the inclining angle, a rotating speed of the stereoscopic 3D space image further increases. Hence, through such a change of the 3D space image, the user can be provided with vivid scene information through as if viewing a real scene.

Moreover, the provided stereoscopic 3D space image is displayed in a manner of being rotated or zoomed in/out by a user's menu manipulation or a user's touch input of a specific pattern, thereby providing a user interface having a 3D effect better than that provided by the related art method.

Figure 22:
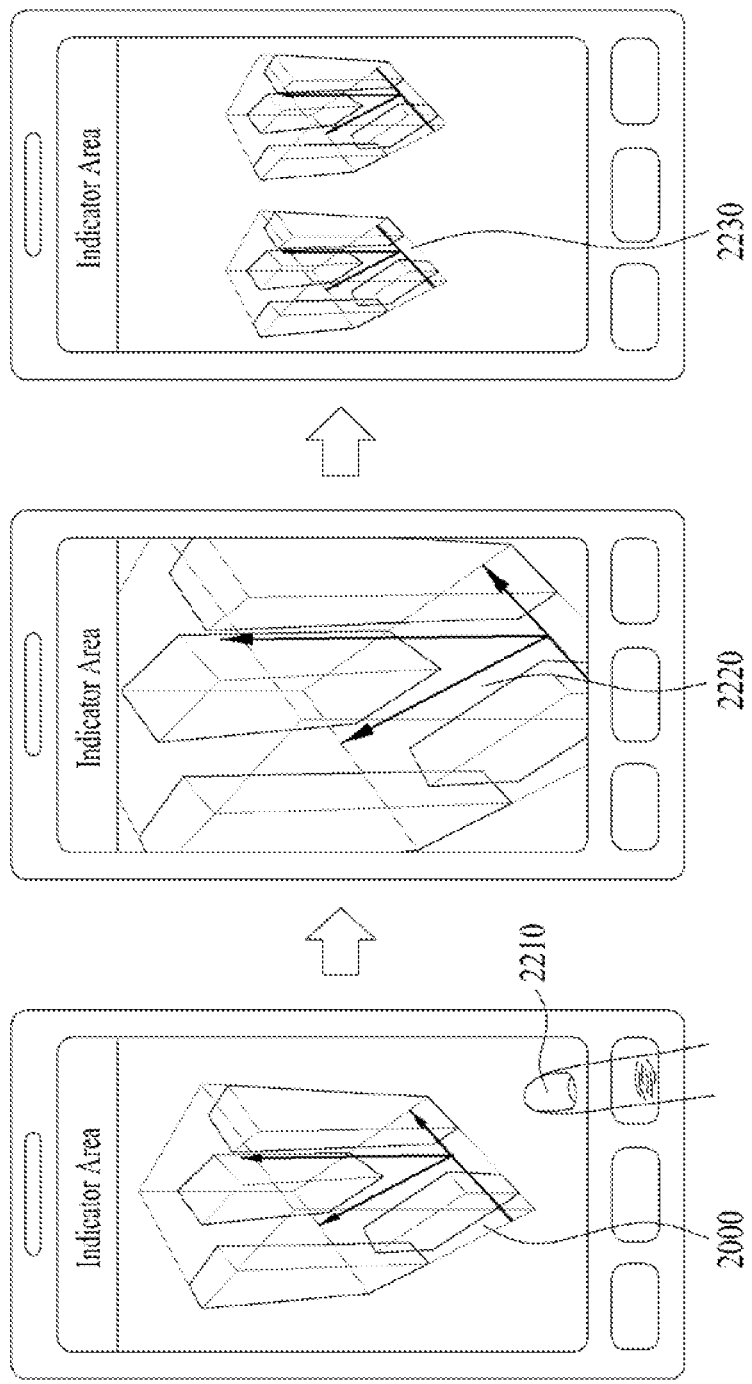
FIG. 22 is a diagram for one example of displaying a created stereoscopic 3D space image by zooming in/out the created stereoscopic 3D space image 3-dimensionally according to one embodiment of the present invention.

FIG. 22 is a diagram for one example of displaying a created stereoscopic 3D space image by zooming in/out the created stereoscopic 3D space image 3-dimensionally according to one embodiment of the present invention.

Referring to FIG. 22, since a created stereoscopic 3D space image includes a plurality of 3D images, a corresponding image can be provided to a user in a manner of 3D zoom-in/out.

In particular, unlike the conventional 2D image, a 3D zoom-in/out image can be provided to a user instead of a 2D zoom-in/out image.

For instance, if a user zooms in on a $1^{st}$ portion of a stereoscopic 3D image, the $1^{st}$ portion may be displayed not as a 2D image but as a 3D image in a manner of being enlarged into a prescribed size. Hence, the user may experience an effect as if having a real view of the $1^{st}$ portion and may be able to acquire information more accurate than that of the related art.

This zoom-in/out function may be provided to a user only if a touch of a specific pattern is inputted.

In this case, the touch input of the specific pattern may conceptionally include one of a normal touch, a long touch, a double touch, a proximity touch, a touch drag, a flicking and the like.

In FIG. 22, assume that the touch input of the specific pattern is set to a double touch.

Referring to FIG. 22, if a user performs a double touch 2210 on a portion of a stereoscopic 3D image 2000, the controller 180 may provide the user with a zoom-in image 2220 of the double touched portion in response to the double touch 2210.

If the double touch 2210 is set to interoperate with a zoom-out function, the controller 180 may provide the user with a zoom-out image 2230 of the double touched portion. Hence, through such a change of the 3D space image, the user can be provided with vivid scene information through as if viewing a real scene.

Meanwhile, according to another embodiment of the present invention, a quick switch to a normal image gallery provided state from a stereoscopic 3D space image provided state can be possibly performed.

According to a further embodiment of the present invention, in order to inform a user that a stereoscopic 3D space image is provided to the user, the controller 180 may control a separate visual effect to be further displayed on a prescribed region of the display unit 151. This is described in detail with reference to FIG. 23 as follows.

FIG. 23 is a diagram for one example of displaying a visual effect for indicating a stereoscopic 3D space image and a stereoscopic 3D space image or a normal 3D image according to one embodiment of the present invention, in which the stereoscopic 3D space image and the normal image are switched to each other.

Referring to FIG. 23 (a), a stereoscopic 3D space image provided state 2410 may be switched to a normal image gallery provided state 2420. Alternatively, the normal image gallery provided state 2420 can be switched to the stereoscopic 3D space image provided state 2410.

In particular, the stereoscopic 3D space image provided state is switched to the normal image gallery provided state in response to a touch input of a specific pattern or a user's key manipulation and the normal image gallery provided state is then displayed on the display unit 151. Alternatively, the normal image gallery provided state is switched to the stereoscopic 3D space image provided state in response to a touch input of a specific pattern or a user's key manipulation and the stereoscopic 3D space image state is then displayed on the display unit 151.

Referring to FIG. 23 (b), in order to inform a user that a stereoscopic 3D space image is provided, a separate visual effect 2430 may be displayed on a prescribed region of the display unit. In this case, the prescribed visual effect may include at least one of a color change, a definition or resolution change, a transparency change and the like. Through the visual effect 2430, the user is able to easily recognize that the mobile terminal 100 is currently in the stereoscopic 3D space image provided mode.

According to one embodiment of the present invention, the above-described methods can be implemented in a program recorded medium as processor-readable codes. The processor-readable media include all kinds of recording devices in which data readable by a processor system are stored. The processor-readable media include ROM, RAM, CD-ROM, magnetic tapes, floppy discs, optical data storage devices, and the like for example and also include carrier-wave type implementations (e.g., transmission via Internet).

The aforementioned embodiments for a mobile terminal and controlling method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a position location unit configured to obtain a current location of the mobile terminal;
   a display unit configured to display a map in a prescribed range that corresponds to the obtained current location;
   a user input unit configured to set an area for creating a three dimensional (3D) space image on the displayed map;

a camera configured to consecutively obtain a plurality of right eye images and a plurality of left eye images in the set area; and a controller configured to:
create a source image of the 3D space image that corresponds to the set area by synthesizing the consecutively obtained plurality of right and left eye images;
output the created source image as a stereoscopic 3D image and control the display unit to display the output stereoscopic 3D image;
determine at least distance information or angle information; and
control the display unit to display first shot location information for the consecutively obtained plurality of right and left eye images on a prescribed region using the determined at least distance information or angle information.

2. The mobile terminal of claim 1, wherein:
the user input unit is further configured to receive selection of a first object from the set area; and
the controller is further configured to control the display unit to display first shot location information corresponding to the selected first object.

3. The mobile terminal of claim 1, wherein:
the position location unit is further configured to sense a location change of the mobile terminal; and
the controller is further configured to:
update the first shot location information, and
control the display unit to display first shot location information in response to the sensed location change.

4. The mobile terminal of claim 1, wherein the controller is further configured to control the display unit to display second shot location information indicating a direction of movement of the mobile terminal in order to consecutively obtain the plurality of right and left eye images in the set area.

5. The mobile terminal of claim 4, wherein:
the controller is further configured to attribute a prescribed visual effect to each of the first and second shot location information; and
the prescribed visual effect comprises at least a change of color, a change of a definition of a 3D depth, or a change of transparency.

6. The mobile terminal of claim 1, wherein the 3D space image comprises a cubic space image.

7. The mobile terminal of claim 1, wherein:
the display unit comprises a touchscreen configured to receive a touch input; and
the controller is further configured to control the display unit to rotate the displayed stereoscopic 3D image when the touch input is received.

8. The mobile terminal of claim 1, wherein:
the display unit comprises a touchscreen configured to receive a touch input of a preset pattern; and
the controller is further configured to control the display unit to zoom-in or zoom-out of the displayed stereoscopic 3D image when the touch input is received.

9. The mobile terminal of claim 1, further comprising a sensing unit configured to sense an inclination of the mobile terminal, wherein the controller is further configured to control the display unit to rotate the displayed stereoscopic 3D image when the inclination of the mobile terminal is sensed.

10. The mobile terminal of claim 9, wherein:
the rotation of the displayed stereoscopic 3D image comprises a speed and a direction of rotation; and the controller is further configured to vary the direction and the speed of rotation of the displayed stereoscopic 3D image according to the sensed inclination.

11. The mobile terminal of claim 1, wherein:
the display unit comprises a touchscreen configured to receive a touch input of a preset pattern; and
the controller is further configured to output the plurality of right and left eye images as the stereoscopic 3D image instead of the 3D space image when the touch input is received.

12. A method of controlling a mobile terminal, the method comprising:
displaying a map on a display unit, the displayed map being in a prescribed range according to a current location of the mobile terminal obtained via a position location unit;
setting an area to create a 3D space image on the displayed map;
displaying first shot location information for obtaining a plurality of right eye images and a plurality of left eye images in the set area using at least distance information or angle information;
consecutively obtaining the plurality of right and left eye images in the set area;
creating a source image of the 3D space image for the area by synthesizing the consecutively obtained plurality of right and left eye images;
outputting the created source image as a stereoscopic 3D image; and
displaying the output stereoscopic 3D image on the display unit.

13. The method of claim 12, further comprising:
detecting selection of a first object from the set area via a user input unit; and
displaying first shot location information according to the detected selection of the first object.

14. The method of claim 12, further comprising:
updating the first shot location information in response to a location change of the mobile terminal; and
displaying the updated first shot location information.

15. The method of claim 12, further comprising:
displaying second shot location information indicating a direction of movement of the mobile terminal in order to consecutively obtain the plurality of right and left eye images in the set area.

16. The method of claim 12, wherein the 3D space image comprises a cubic space image.

17. The method of claim 12, further comprising:
receiving a touch input via a touchscreen included in the display unit; and
rotating the displayed stereoscopic 3D image when the touch input is received.

18. The method of claim 12, wherein:
receiving a touch input of a pattern via a touchscreen included in the display unit; and
zooming-in or zooming-out the displayed stereoscopic 3D image when the touch input is received.

19. The method of claim 12, further comprising:
sensing an inclination of the mobile terminal via a sensing unit; and
rotating the displayed stereoscopic 3D image; and
varying a direction and a speed of rotation of the rotating stereoscopic 3D image according to the sensed inclination.

20. The method of claim 12, further comprising:
receiving a touch input of a pattern via a touchscreen included in the display unit; and outputting the consecutively obtained plurality of right and left eye images as the stereoscopic 3D image instead of the 3D space image when the touch input is received.

\* \* \* \* \*